US008839146B2

(12) United States Patent
Tseng et al.

(10) Patent No.: US 8,839,146 B2
(45) Date of Patent: Sep. 16, 2014

(54) USER INTERFACE FOR A WIRELESS DEVICE

(75) Inventors: Tina L. Tseng, Sunnyvale, CA (US);
Rob Haitani, Menlo Park, CA (US);
Pamela Mead, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1075 days.

(21) Appl. No.: 11/469,969

(22) Filed: Sep. 5, 2006

(65) Prior Publication Data

US 2008/0295017 A1     Nov. 27, 2008

(51) Int. Cl.
*G06F 3/14* (2006.01)
*H04M 1/725* (2006.01)
*G06F 3/0483* (2013.01)

(52) U.S. Cl.
CPC ......... *H04M 1/72583* (2013.01); *G06F 3/0483* (2013.01)
USPC ........... 715/810; 715/711; 715/764; 715/779; 345/111

(58) Field of Classification Search
USPC ......................................... 715/810–847, 864
See application file for complete search history.

(56) References Cited

U.S. PATENT DOCUMENTS

| | | | |
|---|---|---|---|
| 5,949,413 A | 9/1999 | Lerissa et al. | |
| 6,625,583 B1 | 9/2003 | Silverman et al. | |
| 2004/0113948 A1 | 6/2004 | Shahrbabaki et al. | |
| 2005/0144560 A1 * | 6/2005 | Gruen et al. | 715/711 |
| 2006/0085759 A1 | 4/2006 | Knapheide | |
| 2006/0101350 A1 * | 5/2006 | Scott | 715/779 |
| 2006/0161857 A1 | 7/2006 | Johnston et al. | |
| 2006/0161865 A1 * | 7/2006 | Scott et al. | 715/810 |
| 2006/0184575 A1 | 8/2006 | Singleton | |
| 2006/0224985 A1 * | 10/2006 | Baek et al. | 715/764 |
| 2008/0163093 A1 | 7/2008 | Lorido | |

FOREIGN PATENT DOCUMENTS

| | | |
|---|---|---|
| FR | 2882439 A1 | 8/2006 |
| WO | 2008030794 A2 | 9/2007 |

OTHER PUBLICATIONS

Supplementary European Search Report, European Application No. 07841803.5, Date of Completion of the Search: Oct. 26, 2011 Date of Mailing: Nov. 7, 2011 pp. 1-7.

* cited by examiner

*Primary Examiner* — Ruay Ho

(74) *Attorney, Agent, or Firm* — Fulbright & Jaworski LLP

(57) ABSTRACT

Various embodiments of a user interface for a wireless device are described. In one embodiment, a wireless device may include a processor, a memory coupled to the processor, and a display coupled to the processor. The processor presents a navigation bar on the display. The navigation bar comprises multiple selectable tabs. The processor detects an input corresponding to a selection of any one of the multiple tabs and presents a user interface view associated with the any one of the multiple tabs on the display when the input is detected.

26 Claims, 19 Drawing Sheets

USER INTERFACE FOR A WIRELESS DEVICE

BACKGROUND

Handheld information organization and communications devices are becoming increasingly popular for both business users and more general users. These handheld devices may be referred to as personal digital assistants (PDA), pocket personal computers (pocket PC), palmtop computers, smart phones, handheld computers, and so forth. A handheld device may be small enough to fit into a purse or a pocket, and may weigh less than one pound. As a result, the handheld device is very portable. Some examples of handheld devices for organizing calendars, storing personal contact information, and/or providing communication functionality include the 3Com line of Palm® handheld computers, the Palm® Treo™ line of smart phones, the Handspring Visor™ line of handheld computer systems, and the Microsoft® PocketPC.

These handheld devices may include telephone software applications. For example, with a telephone application, a user may dial a number, look up a contact, personalize and show a wallpaper image, display alerts and other status items, set up links (favorites) to speed dials and other applications, universal resource locators (URLs), and also may include functionality for cellular carrier requirements.

These handheld devices may include other applications to hold and manage personal information. For example, an address book application may be used to store and access a list of acquaintances and contact details. Typically, these handheld devices contain Personal Information Management (PIM) software applications such as an address book, a calendar application, a memo application, and a To-Do list application. Such handheld devices are generally small enough to be carried all the time and do not require any "boot" time before entering an operational state. Accordingly, such handheld devices allow constant access to a large amount of personal information.

One aspect of a handheld device provides an intuitive method of quickly accessing the personal information data. In this regard, handheld devices based on the Palm® Operating System (PalmOS) have captured a large proportion of the handheld computer system market. With the PalmOS, a user may select and manipulate data in a number of different ways. For example, a user may use up/down scroll buttons, a user may select an item displayed on a touch screen, and a user may scroll through different category lists by repeatedly pressing an application button.

A user may interact with the handheld device using a stylus, or pen, to touch a portion of the display screen. Electronic sensors in a display screen of the handheld device detect the point of contact between the stylus and the screen. The user can input information into the handheld device by tracing the shape of a character on the display screen. The user also may cause the handheld computer to perform a function by touching the name of the function when the name is displayed on the screen.

Handheld devices and other portable computing devices require considerable amount of user-interaction. Because such devices are small, user-interface features of handheld devices are typically incorporated into a compact arrangement of buttons and display features. Display features on the handheld device may be contact sensitive. The contact-sensitive nature of the display provides users with a rich and diverse means by which input can be entered and viewed. For example, a handheld device may comprise a graphic user-interface including a system of user-interface views, view buttons, and/or command buttons.

DETAILED DESCRIPTION

Various embodiments may be directed to systems and techniques to provide a graphic user interface (user interface) that may improve the performance of a wireless device to display content from a media source. In one embodiment, for example, a wireless device may include a display comprising a plurality of display regions to display elements associated with the user interface. The user interface may provide a functional interface to a variety of underlying applications. In various embodiments, these underlying applications may be selected from a navigation bar displayed on the wireless device. The underlying applications may comprise, for example, a telephone application, a dial pad application, a favorites application, a contacts application, and a call log application. Additional or fewer applications may be associated with the user interface. In various embodiments, each of the underlying applications may comprise associated views that may be invoked via respective navigation tabs that collectively form the navigation bar. For example, the telephone application may be invoked by selecting a main telephone application tab on the navigation bar to display the telephone application user interface main view. The dial pad application may be invoked by selecting a dial pad tab on the navigation bar to display a dial pad view. The favorites application may be invoked by selecting a favorites tab on the navigation bar to display a favorites view. The contacts application may be invoked by selecting a contacts tab on the navigation bar to display a contacts view. The call log application may be invoked by selecting a call log tab on the navigation bar to display a call view.

Figure 1:
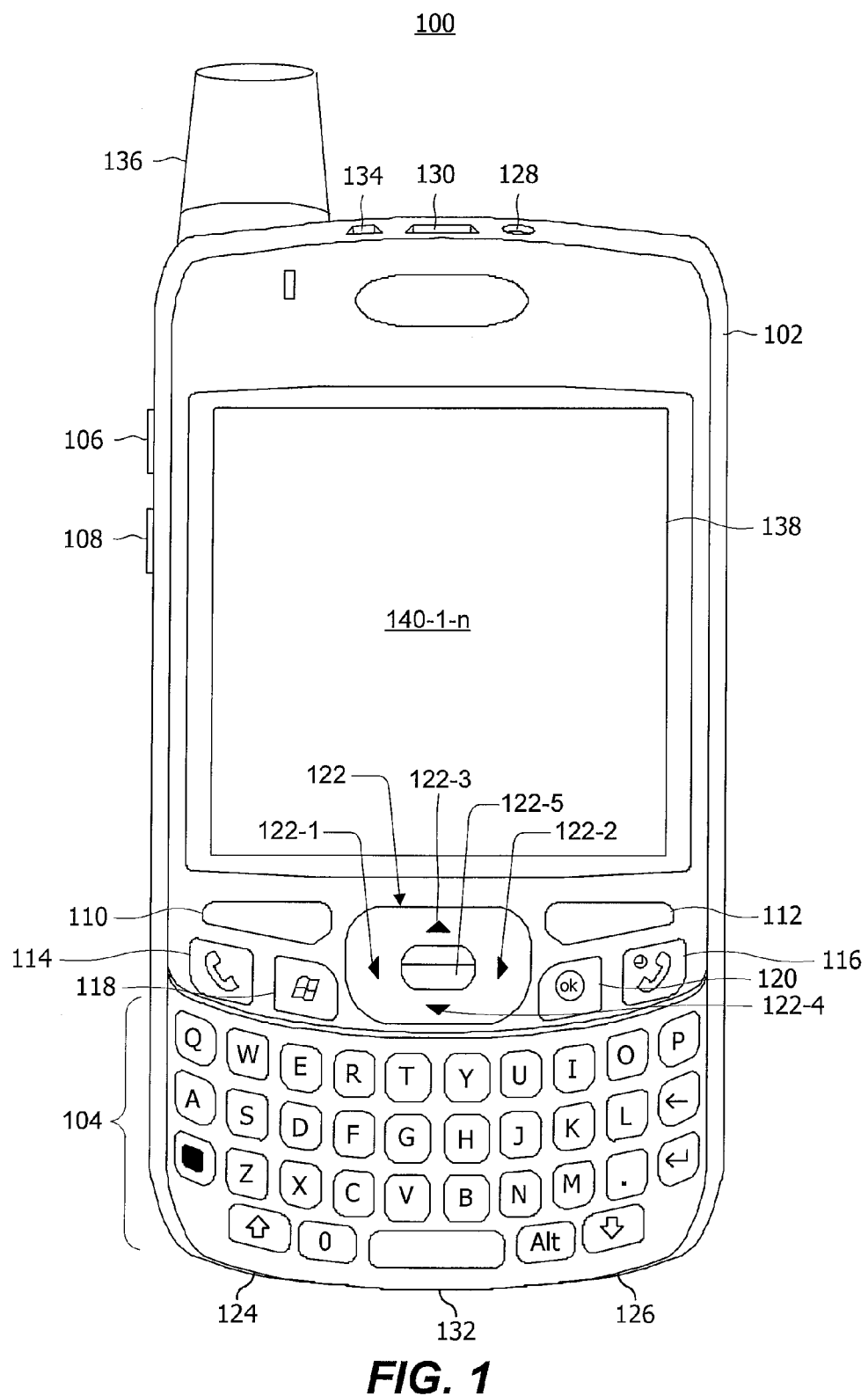
FIG. 1 illustrates one embodiment of a handheld device implemented as a wireless device.

FIG. 1 illustrates one embodiment of a handheld device implemented as a wireless device 100. As shown, the wireless device 100 may be implemented as a combination handheld computer and mobile telephone or smartphone. Examples of smartphones include, for example, Palm® products such as Palm® Treo™ smartphones. Although some embodiments may be described with the wireless device 100 implemented as a smartphone by way of example, it may be appreciated that the embodiments are not limited in this context. For example, the wireless device 100 may comprise, or be implemented as, a handheld computer, mobile telephone, personal digital assistant (PDA), combination mobile telephone/PDA, data transmission device, one-way pager, two-way pager, and so forth.

Figure 27:
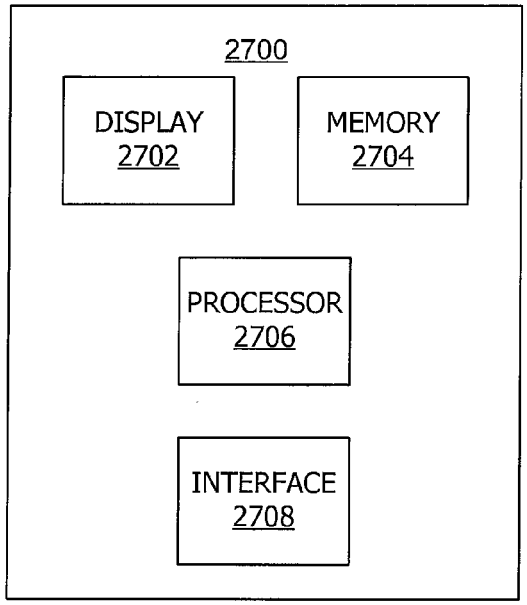
FIG. 27 illustrates one embodiment of a computing system.

The wireless device 100 may comprise a housing 102. The housing 102 may include one or more materials such as plastic, metal, ceramic, glass, and so forth, suitable for enclosing and protecting the internal components of the wireless device 100. The wireless device 100 may comprise various internal components such as, for example, a processor, a memory, one or more transceivers, one or more printed circuit board (PCBs), and so forth. For example, in one embodiment, the wireless device 100 may comprise a computing system 2700 as shown in FIG. 27 and described below. The embodiments, however, are not limited in this context.

The wireless device 100 may comprise various input/output (I/O) devices such as a keyboard, keys, buttons, switches, a microphone, an audio headset, a camera, a touch-sensitive display screen, a stylus, and so forth. As shown in FIG. 1, for example, the wireless device 100 may comprise an alphanumeric keyboard 104 having a QWERTY key layout and an integrated number dial pad. The wireless device 100 may comprise various buttons such as, for example, a volume button 106, a customizable button 108, a send button 110, a power/end button 112, a phone application button 114, a menu button 116, a start button 118, an OK button 120, and a navigation button 122. The wireless device 100 may comprise an audio port 124 to connect an audio headset, a microphone 126, a ringer on/off switch 128 having a vibrate mode, and an expansion slot 130 to support a multimedia and/or memory card, for example.

In one embodiment, the navigation button 122 may be used to enter navigation information corresponding to an upward, downward, rightward, or leftward direction relative to the display 138. The navigation button 122 may comprise left 122-1, right 122-2, up 122-3, down 122-4, and center 122-5 keys, which may be actuated to navigate and/or select a particular function or menu on the display 138. Other embodiments may provide for a multi-directional pad or element, instead of the navigation button 122, which can be actuated in multiple directions. Examples of such devices include a 4-, 5-, or 8-way multidirectional pad or joy-stick.

The wireless device 100 may comprise a serial connection port 132, an infrared port 134, and/or integrated Bluetooth® wireless capability to enable wired (e.g., USB cable) and/or wireless connection to a local computer system, such as a local personal computer (PC). In various implementations, the wireless device 100 may be arranged to transfer and/or synchronize information with the local computer system. The wireless device 100 also may comprise a rechargeable battery, such as a removable and rechargeable lithium ion battery, and an AC adapter.

The wireless device 100 may comprise an antenna system including one or more antennas, such as an external antenna 136 implemented by a stub antenna, a whip antenna, an extendable antenna, and so forth. In various embodiments, the antenna system may comprise one or more internal antennas such as a planar inverted-F antenna, a planar inverted-L antenna, an inverted-F antenna with a helical structure, an inverted-L antenna with a helical structure, a monopole antenna, a meandered monopole antenna, a dipole antenna, a balanced antenna, a printed helical antenna, a chip antenna, a ceramic antenna, and so forth.

In various embodiments, the antenna system may be tuned for operating at one or more frequency bands such as the 824-894 Megahertz (MHz) frequency band for GSM operations, the 1850-1990 MHz frequency band for Personal Communications Services (PCS) operations, the 1575 MHz frequency band for Global Positioning System (GPS) operations, the 824-860 MHz frequency band for NAMPS operations, the 1710-2170 MHz frequency band for Wideband CDMA/Universal Mobile Telephone System (WCDMA/UMTS), ISM band in 2.4 GHz range for WiFi and Bluetooth, and other frequency bands. In various implementations, the antenna system may be used to implement spatial diversity techniques such as Evolution Data Optimized (EVDO) diversity at both 800 MHz (cellular) and 1900 MHz (PCS) bands.

The wireless device 100 may comprise a display 138. The display 138 may be implemented by a LCD or other type of suitable visual interface. The display 138 may comprise, for example, a touch-sensitive color (e.g., 16-bit color) display screen. In various implementations, the display 138 may comprise a thin-film transistor (TFT) LCD including embedded transistors. In such implementations, the display 138 may comprise a transistor for each pixel to implement an active matrix. While the embodiments are not limited in this context, an active matrix requires lower current to trigger pixel illumination and is more responsive to change than a passive matrix.

The display 138 may be arranged to display media source content received by the wireless device 100. In various embodiments, the display 138 may be arranged to display the media source content in one or more modes, such as in a panoramic mode, a wide mode, and/or an optimized mode. In such embodiments, the modes may be selected under user-control.

The media source content may comprise, for example, image information, video information, and/or audio/visual (A/V) information from a media source. In various embodiments, the media source content may comprise data derived from or associated with one or more images, image files, image groups, pictures, digital photographs, videos, video clips, video files, video sequences, video feeds, video streams, movies, broadcast programming, web pages, user interfaces, graphics, regions, objects, frames, slices, macroblocks, blocks, pixels, sub-pixels, signals, and so forth.

In various implementations, the media source content received and to be displayed may comprise pixels derived from or associated with one or more static or video images. The pixels may comprise, for example, red-green-blue (RGB) pixels and/or luminance-chrominance pixels (e.g., YUV, YCC) and may include real and/or integer values. The embodiments are not limited in this context.

The media source generally may comprise any source capable of delivering media source content to the wireless device 100. An example of a media source may include a source for static or video image information, such as from a computer to a display. The media source may include a server, such as a web server arranged to deliver web content. Another example of a media source may include a source for A/V information such as television signals. The media source may be arranged to deliver standard analog television content, digital television content, HDTV content, and so forth. The media source may provide broadcast or streaming analog or digital video content. The media source may include a device arranged to deliver pre-recorded media content stored in various formats, such as a DVD device, a Video Home System (VHS) device, a digital VHS device, a digital camera, video camera, a portable media player, a gaming device, and so forth.

In various embodiments, the wireless device 100 may be arranged to receive media source content through one or more wireless wide area network (WWAN) data communication services. Examples of cellular data communication systems offering WWAN data communication services may include a GSM with General Packet Radio Service (GPRS) systems (GSM/GPRS), CDMA/1×RTT systems, Enhanced Data Rates for Global Evolution (EDGE) systems, Evolution Data Only or EVDO systems, Evolution for Data and Voice (EV-DV) systems, High Speed Downlink Packet Access (HSDPA) systems, and so forth. The embodiments are not limited in this context.

In various embodiments, the media source content may comprise an aspect ratio and/or a resolution that differs from the aspect ratio and/or the resolution of the display 138. In one embodiment, for example, the media source content may have an aspect ratio of 3:2 with a resolution of 480×320, and the display may have an aspect ratio of 1:1 with a resolution of 320×320. In another embodiment, for example, the media source content may have an aspect ratio of 2:1 with a resolution of 640×320, and the display may have an aspect ratio of 3:2 with a resolution of 480×320. The embodiments are not limited in this context.

In some embodiments, for example, the wireless device 100 may comprise display control hardware implemented by one or more processors, controllers, encoder devices, decoder devices, coder/decoder (CODEC) devices, scaling devices, filters, converters, circuits, chips, logic devices, logic gates, switches, registers, semiconductor devices, transistors, or combination thereof.

In some embodiments, for example, the wireless device 100 may comprise display control software implemented by one or more applications, drivers, programs, modules, sub-routines, instruction sets, instructions, computing codes, or combination thereof. The display control software may be implemented according to a predefined computer language for instructing a processor to perform a certain function. Examples of a computer language may include C, C++, Java, BASIC, Perl, Matlab, Pascal, Visual BASIC, assembly language, machine code, micro-code, and so forth.

In one embodiment, the wireless device 100 may comprise a telephone software application (telephone application). The telephone application may provide a user interface to make the telephone functionality of the wireless device 100 easier to use and more appealing to a broader base of users, such as users accustomed to using a simple wireless telephone rather than a handheld device with additional functionality such as the wireless device 100, for example. The telephone application provides a user interface with multiple different views of information enabling a user to make telephone calls in an intuitive manner. The telephone user interface views may be implemented as viewing and dialing applications for the wireless device 100, for example. From the telephone application, a user may dial a number, look up a contact, personalize to show a wallpaper image, display alerts and other status items, and set up links (favorites) to speed dials and other applications, URLs, etc. The telephone application also may comprise the core functionality for the wireless device 100 (e.g., GSM handset) and carrier requirements, for example. In various embodiments, the telephone application provides an integrated (and extensible) phone experience for the user with and also provides fast access to core the functionality of the wireless device 100, even when the user is on an active call. The telephone application also may provide a substantially seamless user experience when looking up a contact for dialing.

In operation the wireless device 100 displays information to the user in the display 138 area. The telephone application provides one or more telephone user interface views in a predetermined structure. In one embodiment, the wireless device 100 may comprise several telephone user interface view components and other user interface components. The telephone user interface view components may include, for example, a main view, contacts view, dial pad view, favorites view, call log view, and active call view. The other user interface components may include, for example, a redial list, preferences, edit favorite dialogs, and incoming call alerts.

In various embodiments, the user may select one of five main telephone application views via a navigation bar portion of the user interface: (1) the dial pad view; (2) the favorites view; (3) the main view; (4) the contacts view; and (5) the call log view. Any of these five views may be selected as the as the default view by the user. It may be appreciated that these are merely some examples of telephone application views appropriate for this user interface, and other telephone application views such as an active call view may be implemented as well. The embodiments are not limited in this context.

Main View

Figure 2:
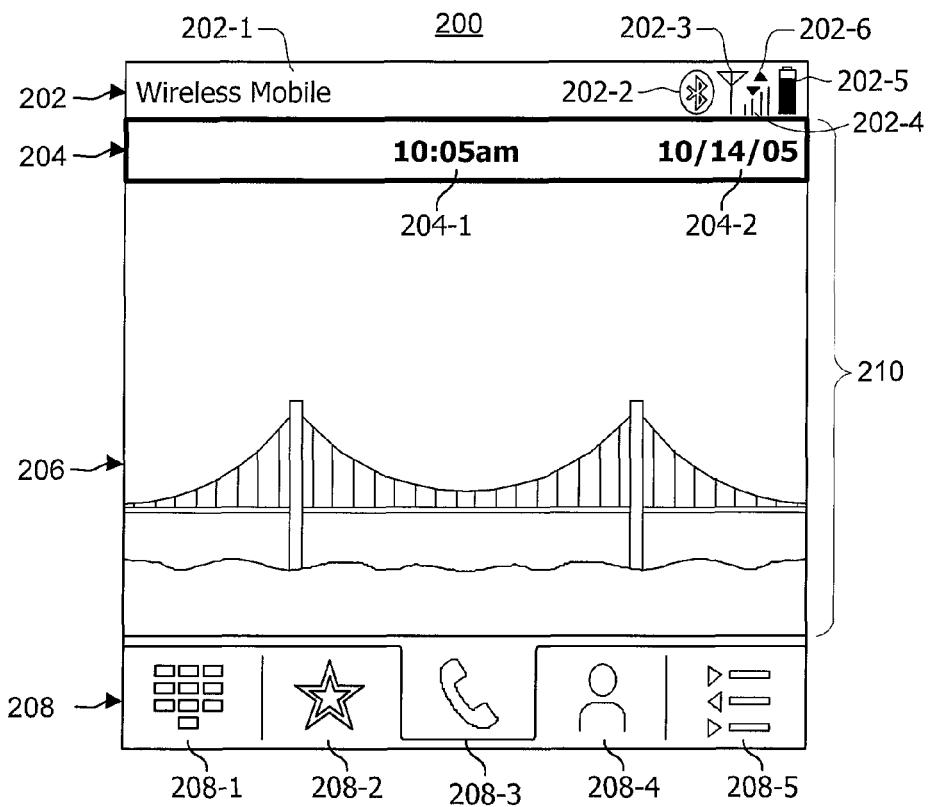
FIG. 2 illustrates one embodiment of a telephone user interface main view.

FIG. 2 illustrates one embodiment of a telephone user interface main view 200. The telephone user interface main view 200 may be the default view that is displayed when the telephone phone application key 114 on the wireless device 100 is pressed from any application. During an active call, the telephone application key 114 may toggle the user between the default telephone user interface main view 200 and an active call screen. The telephone user interface main view 200 may comprise a title bar 202, a messaging bar 204, a bitmap area 206, and a navigation bar 208. In one embodiment, the telephone user interface main view 200 comprises the illustrated navigation bar 208 comprising a default set of virtual buttons or tabs located at the bottom of the main view 200 screen. The navigation bar 208 may comprise one or more virtual buttons, referred to herein as navigation tabs 208-1-5.

Selecting a particular navigation tab 208-1-5 displays a corresponding view, for example. In one embodiment, the navigation bar 208 may comprise a dial pad tab 208-1 to display a dial pad view, a favorites tab 208-2 to display a favorites view, a main telephone application tab 208-3 (shown highlighted and referred to as the "main tab" hereinafter) to display the telephone user interface main view 200, a contacts tab 208-4 to display a contacts view, and a call log tab 208-5 to display a call log view. The navigation bar 208, however, is not limited in this context and additional or fewer tabs, buttons, and/or icons may be displayed in the navigation bar 208 area. The navigation bar 208 allows the user to navigate to the various telephone application views provided by the telephone application user interface.

Figure 4:
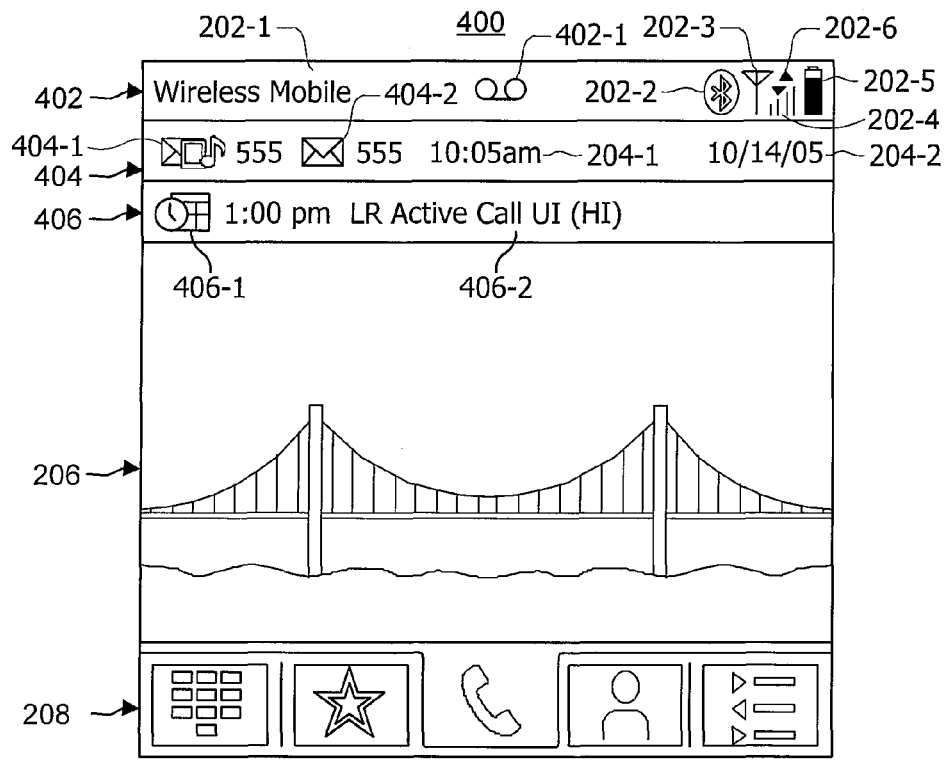
FIG. 4 illustrates one embodiment of a telephone user interface main view.

FIG. 2 illustrates the telephone user interface main view 200. In one embodiment, the main view 200 may be displayed when the main tab 208-3 is highlighted (e.g., selected via the navigation button 122, tapped with a stylus, and/or other input method). The main view 200 also may be invoked by pressing the phone application key 114 from any currently executing applications. During an active call, the telephone application key 114 may toggle the user between default and active call screen views. The telephone user interface main view 200 provides customizable wallpaper, optional calendar entry, and quick snapshot of alerts and status to make dialing via lookup intuitive and also provides opportunities for personalization by the user. The portion 210 of the telephone user interface main view 200 below the title bar 202 and above the navigation bar 208 may be implemented as a bitmap area 206 that may be reconfigured with wallpaper graphics such as a background graphic 212. In one embodiment, the messaging bar 204 and other bars (e.g., a calendar event bar 406 as shown in FIG. 4 below) may be overlaid on top of the bitmap area 208. The messaging bar 204 displays time 204-1 and date 204-2 information. The bitmap area 206 may comprise the background graphic 212, for example. In one embodiment, the resolution of the pixel map in the bitmap area 206 may be 320×320 pixels.

As illustrated in FIG. 2, the telephone user interface main view 200 comprises the title bar 202. In one embodiment, the title bar 202 may include multiple elements. For example, the title bar 202 may comprise title text 202-1 and one or more icons, such as, for example, a Bluetooth icon 202-2, an antenna icon 202-3, a signal strength icon 202-4, a battery meter icon 202-5, and a data status icon 202-6, for example. The icons 202-2-6 may be referred to as gadgets. In one embodiment, the title text 202-1 may comprise, for example, phone status, wireless carrier name, network search, no service, call in progress, and roaming information. For example, when the radio of the wireless device 100 is "off," the title text 202-1 may display "Phone Off." When the radio is "on," but not connected to a network, the title text may display "No Service." When the radio of the wireless device 100 is roaming, the title text 202-1 may display "Roaming" or "Out of Neighbor . . . ," for example. When a voice call is active and the wireless device displays the active call screen, the title text may display the name of the wireless carrier, e.g., "Wireless Mobile," in the embodiment illustrated in FIG. 2. When a voice call is active and the user is in the telephone application user interface main view 200 or when the call forwarding is enabled the title text 202-1 may display "Call in Progress."

Figure 7:
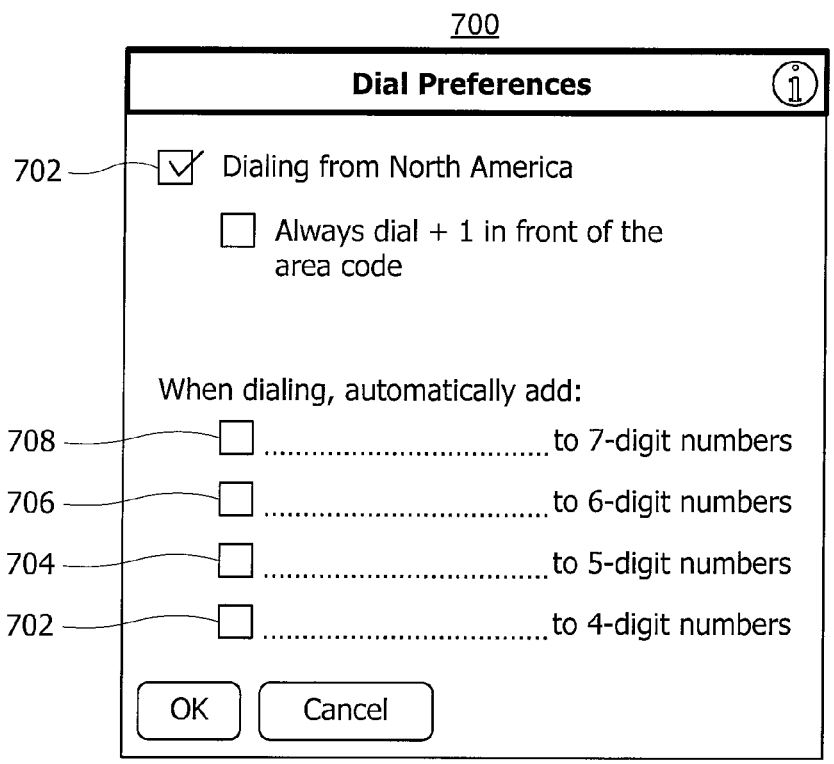
FIG. 7 illustrates one embodiment of a dial preferences dialog box.

Several menus may be accessed or launched from the main view 200. These menus may include, for example, a record menu, an edit menu, and/or an option menu. Additional or fewer menus may be provided in various embodiments. The menus provide one or more methods for executing commands. The commands may be executed by actuating shortcut keys located on the alphanumeric keyboard 104. For example, in the record menu, a user may beam a business card using the "M" shortcut key on the alphanumeric keyboard 104. In the edit menu, a user may paste information using the "P" shortcut key. The options menu allows a user to change line using the "C" shortcut key, open a phone display options dialog using the "Q" shortcut key, open a sound preferences dialog using the "W" shortcut key, open the phone/call preferences dialog using the "A" shortcut key, open a dial preferences dialog box (e.g., dialog box 700 as shown in FIG. 7 below) using the "Z" shortcut key, open a system preferences dialog using the "S" shortcut key, lock the wireless device 100 using the "L" shortcut key, and/or open a phone information dialog using the "I" shortcut key. In addition, the options menu may allow different commands to be executed according to the wireless carrier supported by the wireless device 100.

The navigation bar 208, and in various embodiments in conjunction with the navigation button 122, allows a user to navigate to different telephone application views in accordance with predetermined navigation rules. In one embodiment, when a navigation tab 208-1-5 is selected, the view associated with that navigation tab 208-1-5 is displayed on the display 138. For example, when the dial pad tab 208-1 is selected, the dial pad view 800 (FIG. 8 below) is displayed. If the favorites tab 208-2 is subsequently selected, the favorites view 900 (FIG. 9 below) is displayed without requiring a press of the center button 122-5 of the navigation button 122 to display the favorites view 900.

The following navigation rules may be applied to navigate between views using the navigation bar 208 and the navigation button 122:

(1) If the dial pad tab 208-1 is selected: a left key 122-1 press selects the call log tab 210-5 and a right key 122-2 press selects the favorites tab 208-2;

(2) If the favorites tab 208-2 is selected: a left key 122-1 press selects the dial pad tab 208-1 and a right key 122-2 press selects the main tab 208-3.

(3) If the main tab 208-3 is selected: a left key 122-1 press selects the favorites tab 208-2 and a right key 122-2 press selects the contacts tab 208-4.

(4) If the contacts tab 208-4 is selected: a left key 122-1 press selects the main tab 208-3 and a right key 122-2 press selects the call log tab 208-5.

(5) If the call log tab 208-5 is selected: a left key 122-1 press selects the contacts tab 208-4 and a right key 122-2 press selects the dial pad 208-1.

The telephone user interface main view 200 (or the main view 400 shown in FIG. 4 below) may be accessed from outside or within the telephone application. From outside the telephone application, the main view 200 may be accessed by actuating the phone/send button 110 if the default view is set to the main view 200. From outside the telephone application, the main view 200 also may be accessed by tapping a "Phone" icon with a stylus in the launcher if the default view is set to the main view 200. From within the telephone application, if the default view is set to the main view 200, it may be accessed by actuating the phone/send button 110. Or, by selecting or tapping the main view tab 210-3 on the navigation bar 208.

Figure 9:
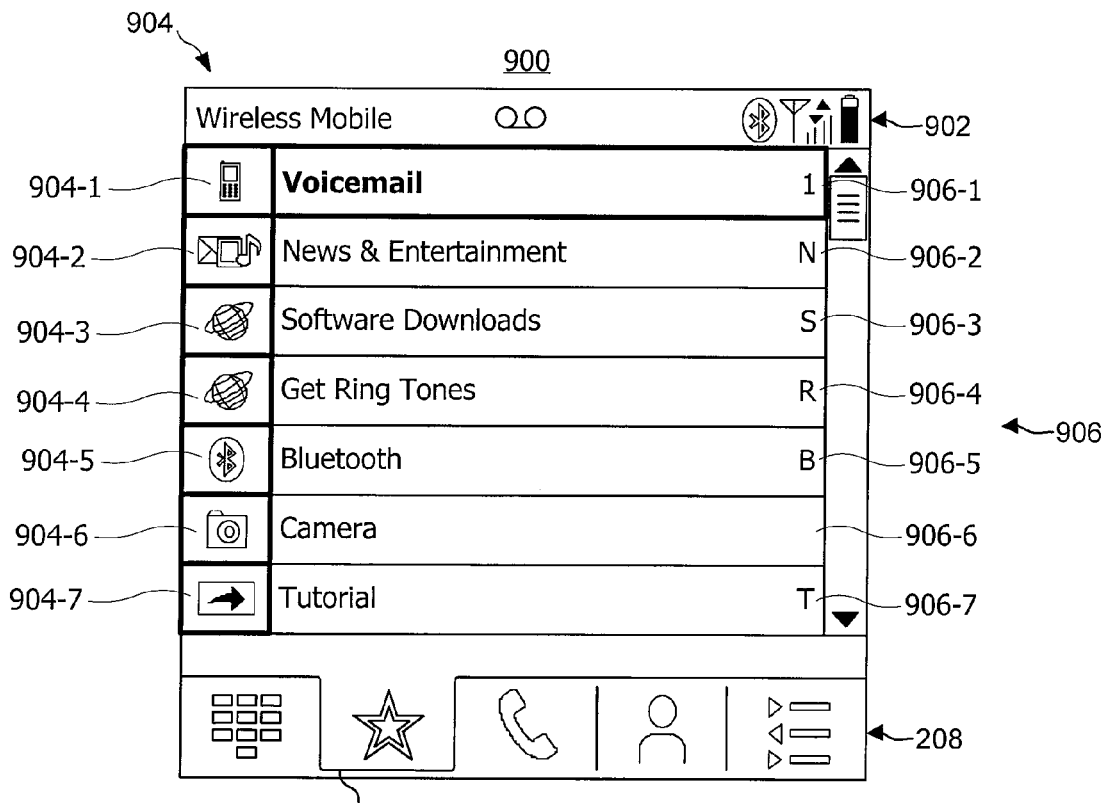
FIG. 9 illustrates one embodiment of a favorites view.
Figure 16:
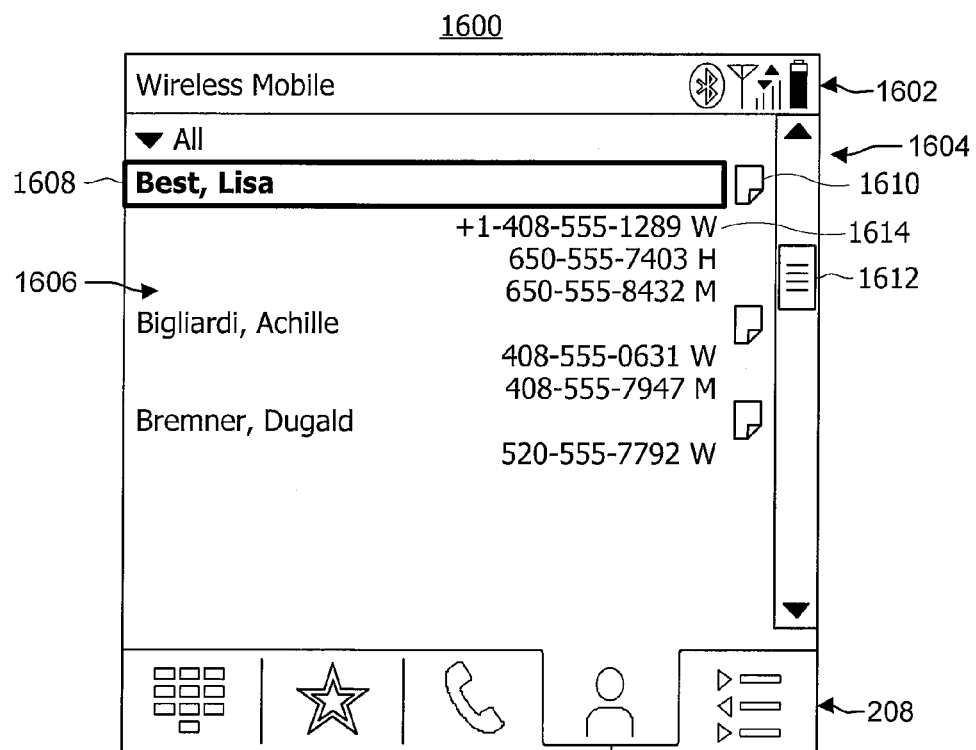
FIG. 16 illustrates one embodiment of a contacts view.

Navigation between views may be accomplished in accordance with the following example navigation model. The respective left/right keys 122-1/122-2 of the navigation button 122 may provide navigation between the several views. Starting with the main view 200 where the main tab 208-3 is highlighted (e.g., selected), pressing the right key 122-2 highlights the contacts tab 208-4 and changes the view to the contacts view 1600 as shown in FIG. 16 below, and pressing the left key 122-1 changes the view to the favorites view 900 as shown in FIG. 9 below. Views also may be changed by tapping on the buttons or tabs 210-1-5 of the navigation bar 208 using a stylus. In addition, the respective up/down keys 122-3/122-4 of the navigation button 122 may be used to navigate within a current view. Actuating the up/down keys 122-3/122-4 of the navigation button 122 may move a focus ring or highlight region ("focus" hereinafter) to a previous item such as, for example, a calendar gadget, a messaging icons, and a voicemail icon, among others.

Figure 3A:
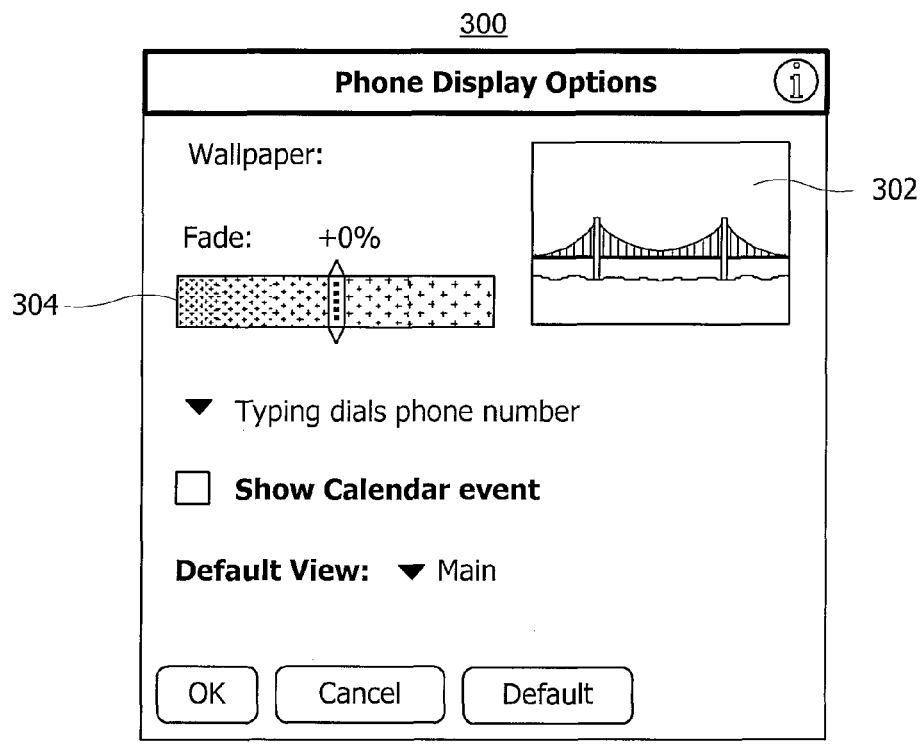
FIG. 3 illustrates one embodiment of a phone display options dialog screen.

FIG. 3 illustrates one embodiment of a phone display options dialog screen 300 that may be invoked by actuating the "Q" shortcut key. In one embodiment, the phone display options dialog screen 300 allows a user to personalize the main view 200 with a custom graphic, as well as different layout settings. As illustrated in FIG. 3, the following configurations options may be available to the user from the phone display options dialog screen 300. The phone display options dialog screen 300 enables the user to select an image 302 as the custom graphic to be used as the background graphic 212 wallpaper in the bitmap area 206 of the main view 200. The background wallpaper image 302 may be a wireless carrier customizable feature, for example, such that the carrier may choose to display either a dial pad or another image of their choosing. A selectable fade bar 304 may be used to set a fade level for the wallpaper image 302 displayed as the background graphic 212 wallpaper in the bit map area 206.

In one embodiment, an alphanumeric lookup feature may comprise an alpha lookup to simplify the dialing experience for the user. For example, if the user enters characters that do not match a name in the contacts or speed dials databases, the user may navigate to the dial pad view 800 (described below FIG. 8) to dial the number, for example. In one embodiment, while the phone display options dialog screen 300 is open, the user may type the numbers on the alphanumeric keyboard 104 to initiate dialing a phone number. Accordingly, the wireless device 100 may be configured such that typing the first few numbers of a telephone number on the keyboard 104 may initiate dialing the telephone number automatically. In which case the phone number being typed is displayed in the dial pad view. The user will remain in the dial pad view 800 (FIG. 8) until he/she switches views or dials a call.

In another embodiment, typing may initiate a contacts search. The contacts search initiates an alpha lookup, described hereinbelow, instead of an alphanumeric look up. A user may dial a telephone number manually from the main view 200 when this option is selected by pressing the option key on the keyboard 104 before typing in the first digit of the phone number that the user is dialing. When this option is selected, a dialog box may be displayed to the user. The dialog box instructs the user that upon typing will now search your contacts instead of dialing a number. In addition the dialog box may instruct the user to press the option key to dial the number manually before typing the first number.

Figure 3B:
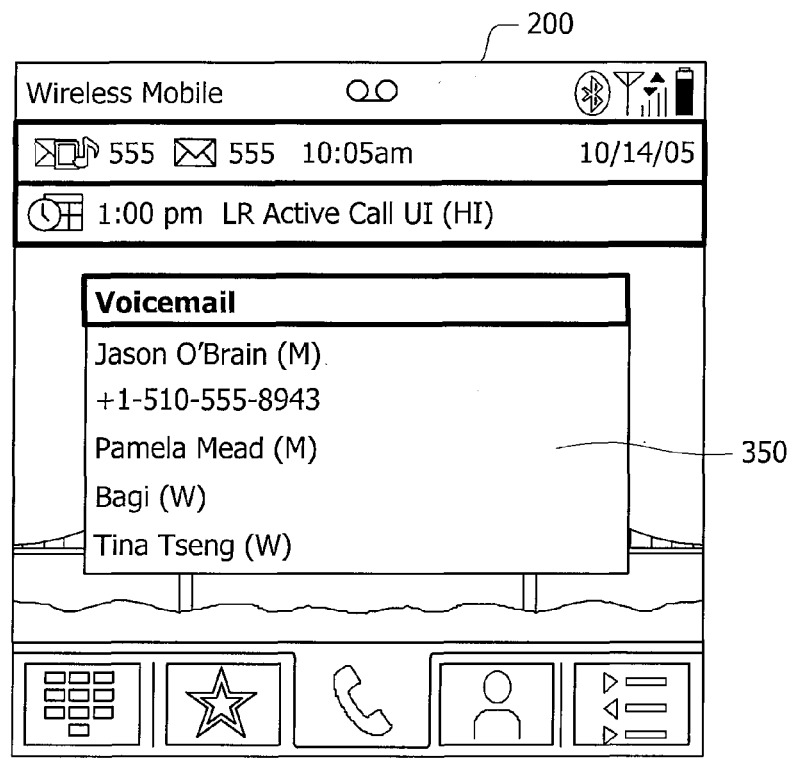

Pressing the send button 110 while in the main view 200 displays a "redial list" 350 within the main view 200 as shown in FIG. 3B. The redial list 350 shows previously dialed numbers. It is noted, however, that because the user may set their own default view, it may be desired that the redial list be displayed in the dial pad view 800 (FIG. 8) when the send button 110 is pressed (e.g., when no numbers are entered). The redial list 350 may be displayed as a pop-up, and associated names may be displayed if there is a match in the contacts list (a feature that may be associated with a call log list). The redial list 350 may be displayed on the release (key up) of the send button 110 after an initial press. Please note that this behavior also may apply when a call is in progress. If a call is in progress, pressing the send button 110 while in the main view 200 displays the redial list 350 while the phone application key 114 toggles between the default main view 200 and an active call view. Pressing and holding the send button 110 while in the main view 200 or dial pad view (described below) redials the last number called. The redial list 350 may not be accessible from other telephone application views. Using the alphanumeric keyboard 104 control, the redial list may be displayed upon pressing the send button 110 from the main view 200 or the dial pad view 800 (FIG. 8). Alternatively, the redial list may also be implemented outside of the main view 200 with different views, and in some cases, outside of the phone application entirely. For example, the functionality associated with the redial list may be implemented anywhere in the system and still fall within the scope of the embodiments. The embodiments are not limited in this context.

FIG. 4 illustrates one embodiment of a telephone user interface main view 400. The telephone user interface main view 400 is similar to the telephone user interface main view 200, but may include additional elements in the title bar 402 and the messaging bar 404, and may comprise an additional events calendar bar 406 overlaid on the bitmap area 206. As illustrated in FIG. 4, the title bar 402 may comprise a voice mail spool icon 402-1 in addition to the title text 202-1 and the Bluetooth icon 202-2, the antenna icon 202-3, the signal strength icons 202-4, the battery meter icon 202-5, and the data status icon 202-6, for example. In one embodiment, the messaging bar 404 may provide status information that shows the number of unread messages for a particular messaging application. The messaging application may comprise, for example, e'mail, SMS, and/or MMS along with date and time. The messaging bar 404 displays a message list view of icons associated with a particular messaging application. The messaging bar 404 displays an SMS/MMS message list view icon 404-1 and the number of unread SMS/MMS messages associated therewith (e.g., 555). The messaging bar 404 also displays an e'mail message list view icon 404-2 and the number of unread e'mail messages associated therewith (e.g., 555). The messaging icons may include SMS, MMS, and e'mail icon, for example. In one embodiment, for wireless carriers requesting a unified SMS and MMS inbox, a single messaging icon may appear in the messaging bar 404. The messaging bar 404 also displays the time 204-1 and date 204-2 information. Any icons that may appear in the messaging bar 404 may be determined by the preferences default applications panel, for example. The default applications panel may be customizable by carriers. If a carrier configures a read-only memory (ROM) without an MMS or e'mail client, then a carrier can elect to hide these options from the default applications panel. The telephone application refers to the default applications panel to identify the exact application that has registered for SMS, MMS, and/or e'mail.

The associated list view icon 404-1, 404-2 for each of the messaging applications appears in the messaging bar 404. Each of the application icons that appear in the messaging bar 404 may be actionable. A focus may appear around the list view icon+unread message count 404-1, 404-2 when a given application is selected. Pressing the center key 122-5 of the navigation button 122 when the list view icon+count 404-1, 404-2 is selected or tapping the icon launches the associated application.

The icons that appear in the messaging bar 404 may be determined in other application panels, for example. In one embodiment, the icons may be determined in a preferences default applications panel that may be customizable according to a wireless carrier. If the wireless carrier can configure a read only memory (ROM) without an MMS or an e'mail client, then the wireless carrier can elect to hide these options from the default applications panel, for example. The telephone application may refer to the default applications panel to identify the exact application that has registered for SMS, MMS, and/or e'mail, for example.

In one embodiment, an associated message list view icon 404-1, 404-2 may appear in the messaging bar 404 for each of the messaging applications. Each of the messaging application icons SMS/MMS icon 404-1 and/or e'mail icons 404-2 are actionable. In other words, selecting either icon 404-1, 404-2 launches the associated application. A focus may appear around the message list view icon 404-1, 404-2 plus the unread message count when a given messaging application message list view icon 404-1, 404-2 is selected. To launch an associated application, the user may press the center key 122-5 of the navigation button 122 when the message list view icon 404-1, 404-2 and unread message count is selected or may tap on the messaging application message list view icons 404-1, 404-2.

A messaging application may be configured to support an application programming interface (API) for reporting the number of unread messages. The API may be supported in all messaging applications that are provided with the wireless device 100. The messaging application may be responsible for reporting updates to the unread message count, for example. If the messaging application does not report a value for unread messages, then the count for unread messages may not be displayed and the relevant message list view icons 404-1, 404-2 are hidden from view on the messaging bar 404. When the message list view icon 404-1, 404-2 are visible, they may be selected via the navigation button 122 (e.g., a 5-way button) or by tapping on the icon with a stylus.

The messaging bar 404 also displays the time 204-1 and date 204-2 information. The time 204-1 and the date 204-2 information may appear right-justified in the messaging bar 404. The date 204-2 may be displayed in a Palm® OS standard Latin font, for example, and the time 204-1 may be displayed in a Palm® OS bold Latin font, for example. The time 204-1 and the date 204-2 may be configured to follow the short format rules selected by the user in a format panel of the preferences application.

Navigation between views may be accomplished in accordance with the following example navigation model. With the focus on the calendar gadget pins 406-1, a user may navigate down to other areas of the main view 400 from the calendar gadget icons 406-1. Because there is no default focus in the main view 400, selecting either the up key 122-3 or the down key 122-4 will place the focus on the calendar event bar 406 or another icon depending on the next available/displayed object in accordance with the following rules: (1) selecting the up key 122-3 moves the focus to the e'mail icon 404-2 on the right; (2) selecting the up key 122-3 moves the focus to the SMS/MMS icon 404-1 on the left; and (3) selecting the up key 122-3 again moves the focus to the voicemail icon 404-1. In the reverse direction, with the focus on the voicemail icon 404-1, a user may navigate in accordance with the following rules: (1) selecting the down key 122-4 moves the focus to the SMS/MMS icon 404-1; (2) selecting the down key 122-4 moves the focus to the e'mail icon 404-2; and (3) selecting the down key 122-4 moves the focus to calendar gadget 406-1. Navigation Table 1 illustrates one embodiment of navigation using a 5-way navigation button 122:

TABLE 1

| 5-Way Navigation Button 122 Key Press | Current Position of Focus ring on the main view 400 | | |
|---|---|---|---|
| | SMS/MMS Icon 404-1 | E'mail Icon 404-2 | Calendar Event Bar 406 |
| Down Key 122-4 | E'mail icon 404-2 | Calendar event bar 406 | Pins 406-1 |
| Up Key 122-3 | Voicemail icon 404-1 | SMS icon 404-1 | E'mail icon or mail 404-2 |
| Center Key | Launches SMS application in list view | Launches e'mail application in list view | Launches calendar in day view |
| Left Key 122-1 | Change view | Change view | Change view |
| Right Key 122-2 | Change view | Change view | Change view |

As shown in FIG. 4, the telephone user interface main view 400 may comprise the calendar event bar 406. In one embodiment, the calendar event bar 406 may comprise a calendar list view icon 406-1 and the most recent calendar appointment 406-2. The most recent calendar appointment 406-2 may be truncated at the end of the line with ellipsis if the entire text identifying the appointment does not fit on one line of the calendar event bar 406. The entire calendar event bar 406 may be selected with the navigation button 122 or by tapping in the calendar event bar 406 with a stylus. When the user selects the calendar event bar 406 by pressing the center button 122-5 of the navigation button 122, a calendar application is launched in and is displayed in day view. The most recent calendar appointment 406-2 may be displayed in the calendar event bar 406 in accordance with one or more calendar events rules. In accordance with a first rule, the appointment with the most recent start time that is occurring "now" may be displayed. "Now" may be defined to be the current time, for example. This appointment may be referred to as the "Current Event." In accordance with a second rule, the Current Event may be displayed until ¾ths of the appointment has passed/expired, for example. At that point, the next appointment is displayed, which may be an appointment that has yet to occur and its start time is the closest to "now." It will be appreciated that this rule applies when there is only one appointment occurring "now." In accordance with a third rule, if there are conflicting appointment/overlapping appointments "now," this rule may not apply. For example, if the user has a 1-hour appointment at 9:00 am and another at noon, then the 9:00 am calendar event will appear in the telephone user interface main view 400 within the calendar event bar 406 until the actual time is 9:45 am, for example. After 9:45 am, the next appointment at noon will be displayed in the calendar event bar 406.

Figure 5A:
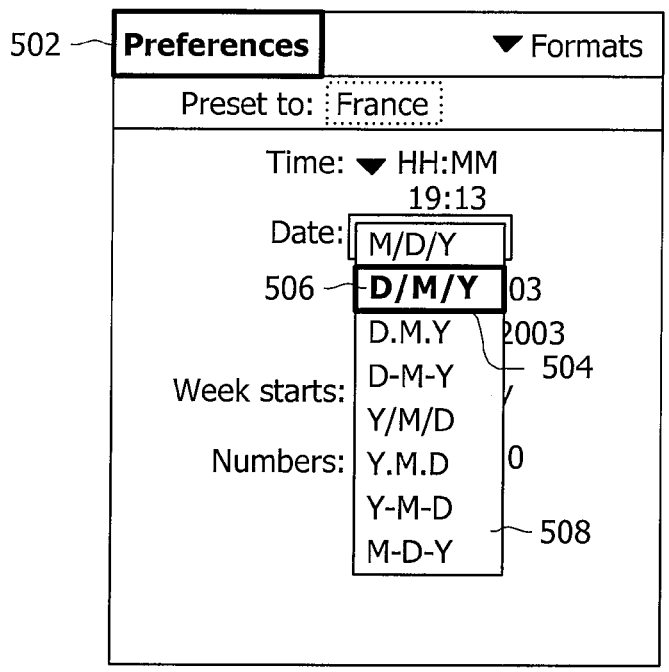
FIG. 5A illustrates one embodiment of a screen shot of a format panel.

FIG. 5A illustrates one embodiment of a screen shot of a format panel 500 in the preferences application panel 502. In the embodiment illustrated in FIG. 5A, a cursor 504 highlights the selected date format 506 from a short format date menu 508.

Figure 5B:
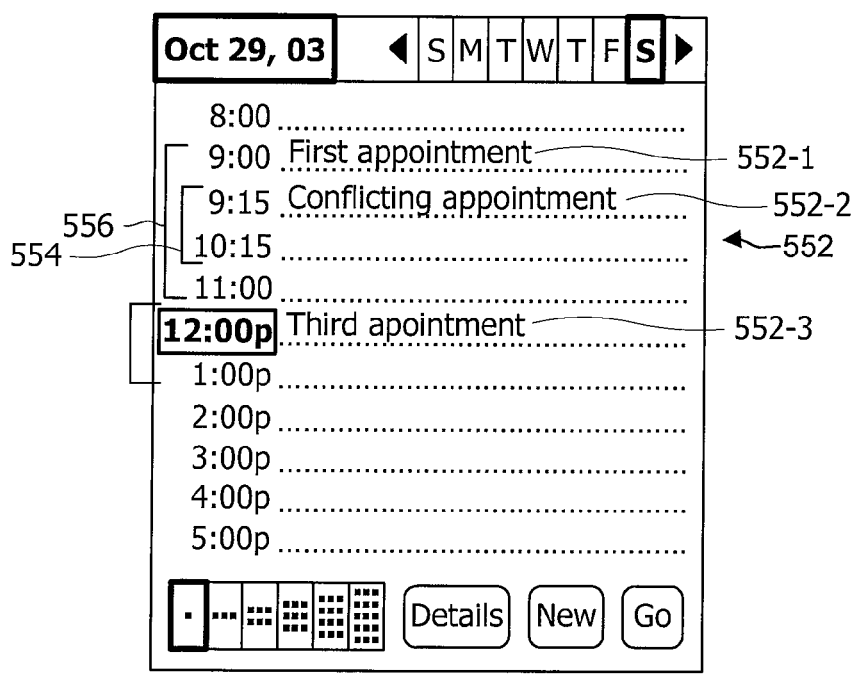
FIG. 5B illustrates one embodiment of a screen shot of a calendar list view.

FIG. 5B illustrates one embodiment of a screen shot of a calendar list view 550. The calendar list view 550 displays calendar text 552 comprising one or more events. If there is a conflict/overlap between two calendar events 552-1, 552-2 then the current event may be the most recent event. For example, if the user has a 1-hour first appointment 552-1 from 9 am to 10 am and another conflicting event 552-2 from 9:15 am to 10 am, then the 9 am first appointment 552-1 will appear in the calendar event bar 406 until 9:15 am as the most recent calendar appointment 406-2. After 9:15 am, the calendar event bar 406 will be refreshed to indicate the 9:15 to 10 am event 552-2. While a conflict exists, (e.g., from 9:15-10 am) a symbol 554 will appear to the left of the calendar text 552. As a placeholder, a conflict icon 556 (e.g., an open bracket, a colored open bracket or other suitable icon) may be displayed to the left of the text.

If, on the other hand, the user has a 2-hour appointment from 9 am to 11 am and another conflicting appointment from 9:15 am to 10:15 am, and a noon event 552-3, then the 9 am appointment will appear in the calendar event bar 406 until 9:15 as the most recent calendar appointment 406-2. After 9:15 am, the calendar event bar 406 will be refreshed to indicate the 9:15 am appointment with the conflict icon 256. After 10:15 am, the calendar event bar 406 will be refreshed to display the original 9:00 am event that is ongoing. It will be appreciated that the 9 am event is displayed after 10:15 am because the conflict has expired. However, the calendar event bar 406 must be refreshed when the actual time is 10:30 to display the noon event 552-3. The noon event 552-3 is displayed because the actual time of 10:30 is ¾ths of the 9 am event 552-1 time.

In accordance with a fourth rule, the text "No upcoming events" may be displayed in the case where no appointments exist for a given day. For example, if on Jan. 12, 2004 the user has 0 appointments until the next appointment on Jan. 13, 2004 at 8 am, display "No upcoming events" until midnight on Jan. 12, 2004. At 12:01 am on Jan. 13, 2004 the calendar event bar 406 is updated with the 8 am event on January 13.

In accordance with a fifth rule, timed events may take precedence over untimed events.

In accordance with a sixth rule, untimed events may be treated like 12:00 am events that expire at the end of the day. Untimed events may be displayed in the calendar event bar 406 if no other upcoming events exist for the current day. In the case of multiple untimed events, a conflict bar will be displayed to the left of the event.

In accordance with a seventh rule, the text "Private event" may be displayed and the lock icon used in the calendar application for the case where the event has been marked private in the calendar application and the user has set the current privacy to mask records in the security application. In the case where the event has been marked private in the calendar application and the user has set the current privacy to hide records in the security application, the text "No upcoming events" may be displayed.

Conflicting events may be prioritized in accordance with various criteria. For example, a first criterion may try to show as many events as possible without randomly switching between events or, a second criterion may try to alert as many new start times as possible. In a third criterion, if two or more events cannot be prioritized by the first two criteria, then the application may show the first in the list. Accordingly, conflicts may be shown if all cases cannot be covered.

Some general rules for prioritizing conflicting events may include, for example, in accordance with the first and second criteria, if two events of different durations end at the same time, the event that starts earlier is displayed first and the one that starts later is displayed next. Otherwise, in accordance with the first criterion, if two events of different durations start at the same time, the one that ends earlier is displayed first and to the one that ends later is displayed when the earlier one is 75% in progress. In addition, in accordance with the third criterion, if two events have exactly the same start and stop time, the first one on the list is displayed. In one embodiment, in order to show as many events as possible, the application may randomly switch between the conflicting events. Moreover, if two overlapping events have different durations, but one has a shorter duration that starts and ends within the other one, then the shorter one is displayed during the overlap but otherwise the longer one is displayed. If there are three events, where two are back to back and the duration of the third is exactly the combination of the other two (e.g., a 1-2 pm, 2-3 pm and a 1-3 pm), then: (1) in accordance with the third criterion, at the beginning, neither the 1-2 pm nor 1-3 pm has higher priority, so whichever is first in the list is displayed. In accordance with the second criterion, the 2-3 pm is displayed as 2 pm approaches. Otherwise, if there is a hodge-podge of multiple conflicts, in accordance with the second and third criteria, in general any event that has a new start time coming up may be displayed, but otherwise just the event at the top of the list is displayed.

TABLE 2 below illustrates one example of the prioritization of conflicting events:

TABLE 2

| Current Time | Calendar Events | Display in Calendar Event Bar 206 |
|---|---|---|
| 2:46pm | 1pm-5pm = Event #1<br>2pm-3pm = Event #2<br>3pm-5pm = Event #3 | |
| 2:46pm | 1pm-5pm = Event #1, Event #3<br>2pm-3pm = Event #2<br>4pm-5pm = Event #3 | Event #3 |
| 1pm | 1pm-2pm = Event #1<br>1pm-2pm = Event #2 | Event #1/#2 depending on which appears first in the calendar list |
| 2pm | 2pm-5pm = Event #1<br>2pm-3pm = Event #2<br>3pm-5pm = Event #3 | Event #1 |
| 1pm | 1pm-2pm = Event #1<br>1:30pm-2:30pm = Event #2 | Show conflict bar at 1:30pm and display Event #1 |

Figure 6:
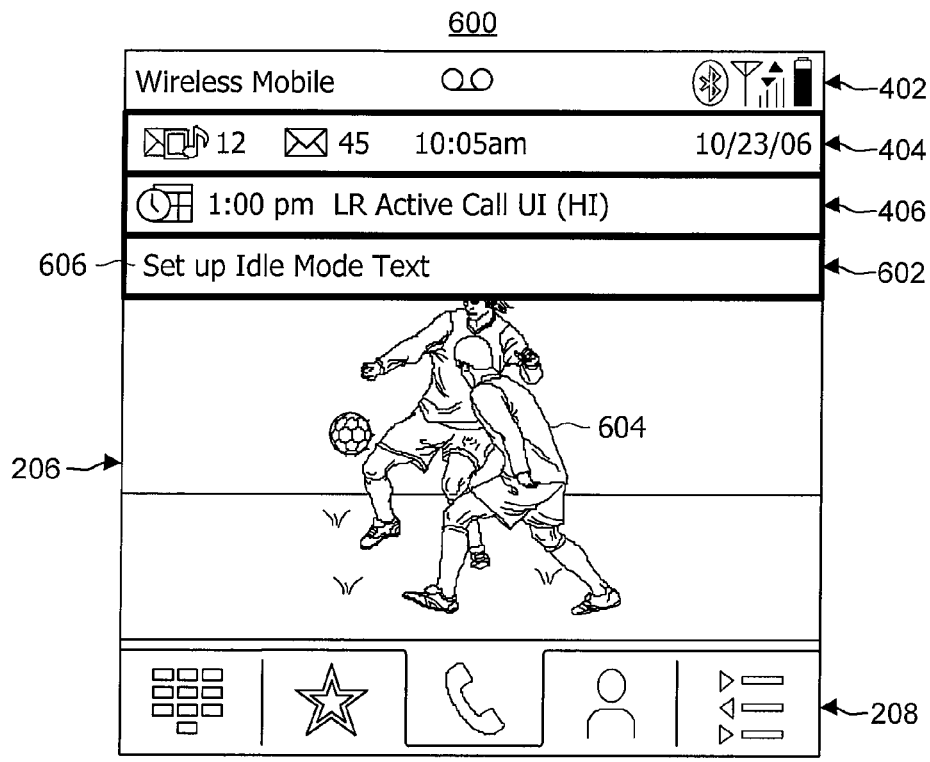
FIG. 6 illustrates one embodiment of a set up idle mode text view in the main view.

FIG. 6 illustrates one embodiment of a set up idle mode text view 600 overlaid on the main view 400, for example. The set up idle mode text view 600 displays an idle mode text bar 602 on the bitmap area 206 displaying a different background graphic 604 from that shown in FIGS. 2 and 4. The background graphic 604 may be displayed below the idle mode text bar 602, which may be located below the calendar event bar 406, for example. In one embodiment, a command, such as a subscriber identification module (SIM) Toolkit command, may allow the SIM to supply idle mode text string 606 within the idle mode text bar 602 (e.g., "Set up Idle Mode Text" in the embodiment illustrated in FIG. 6) to be displayed as idle mode text string 606 in the idle mode text bar 602 in the main views 200, 400 of the telephone application, for example.

In other embodiments, the idle mode text string 606 may be displayed below the messaging bar 404. The idle mode text string 606 may be displayed in any suitable font and may be displayed in Palm® OS Standard Latin font, for example. The idle mode text string 606 may be truncated at the end of the line if it too long to fit with the idle mode text bar 602.

In one embodiment, if the idle mode text string 606 competes with other information to be displayed in the same bitmap area 206, for example a CB Mobile Mail message, then the idle mode text string 606 may be replaced by the other information and when the other information is no longer required to be displayed, the idle mode text string 606 may be redisplayed. In various embodiments, the idle mode text string 606 may be removed from the display 138 when the wireless device 100 is powered off, the SIM is removed, or a refresh command occurs with "initialization" or "reset." In one embodiment, any subsequent SET UP IDLE MODE TEXT command may be used to replace the current idle mode text string 606 displayed by a previous SET UP IDLE MODE TEXT command. If the idle mode text string 606 is provided by the SIM is NULL, the existing idle mode text string 606 is removed from the bit map area 206 display.

FIG. 7 illustrates one embodiment of a dial preferences dialog box 700. Through the dial preferences dialog box 700 a user may make national or international phone calls directly from the contacts list, even if a contact entry has a '+' preceding the phone number. The '+' code may be either dropped or appropriately replaced with a suitable international dialing prefix specified in the dial preferences dialog box 700. The originally dialed digits before translation may be stored in the call log, for example.

For national dialing (e.g., dialing a number from within North America) the checkbox 702 'Dialing from North America' in the dial preferences dialog box 700 is checked. Accordingly, if the dialed number is a leading '+' followed by a 10-digit number or '1' plus 10 digits, then the '+' is dropped. Otherwise, the '+' is replaced by the International Dial Prefix. The '+' code should never be sent to the network and Table 3 below exemplifies the conversion.

TABLE 3

| International Dialing Prefix | Input number | Number sent to network |
|---|---|---|
| 011 | +1-408-555-1212 | 1-408-555-1212 |
| 011 | +408-666-1313 | 011408-666-1313 |
| 011 | +44-55-1234-5678 | 01144-55-1234-5678 |

When dialing from outside North America, the checkbox 702 'Dialing from North America' in the dial preferences dialog box 700 is unchecked. The '+' is replaced by the International Dial Prefix. The '+' code should never be sent to the network. This is illustrated in Table 4 below.

TABLE 4

| International Dialing Prefix | Input number | Number sent to network |
|---|---|---|
| 00 | +1-408-555-1212 | 001-408-555-1212 |
| 00 | +408-666-1313 | 00408-666-1313 |
| 00 | +44-55-1234-5678 | 0044-55-1234-5678 |

In one embodiment (e.g., for GSM applications), the dial preferences dialog box 700 may support pseudo international dialing by allowing a user to automatically pre-pend '+1' instead of just '1', in front of the area code, for example An abbreviated dialing feature allows users to automatically pre-pend a specific string for a given number of digits. For example, a user may pre-pend an area code before all 7-digit numbers by checking a box, or an area code and the first three digits so they may dial all extensions within an organization (e.g., within a private branch exchange "PBX") by entering only a 4-digit extension. Abbreviated dialing may be supported for 4, 5, 6, 7 or more digit numbers by checking the respective boxes 702, 704, 706, 708. The feature may be enabled or disabled per digit strings, i.e., a user may turn off 5-digit dialing but turn on 4-digit dialing by checking the appropriate box 702-708. Each prefix field may be optionally locked. The field is not necessarily limited to a certain number of characters. Accordingly, a user may dial an international number, for example.

Dial Pad View

Figure 8A:
FIGS. 8A-C illustrate various embodiments of a dial pad view.
Figure 8B:
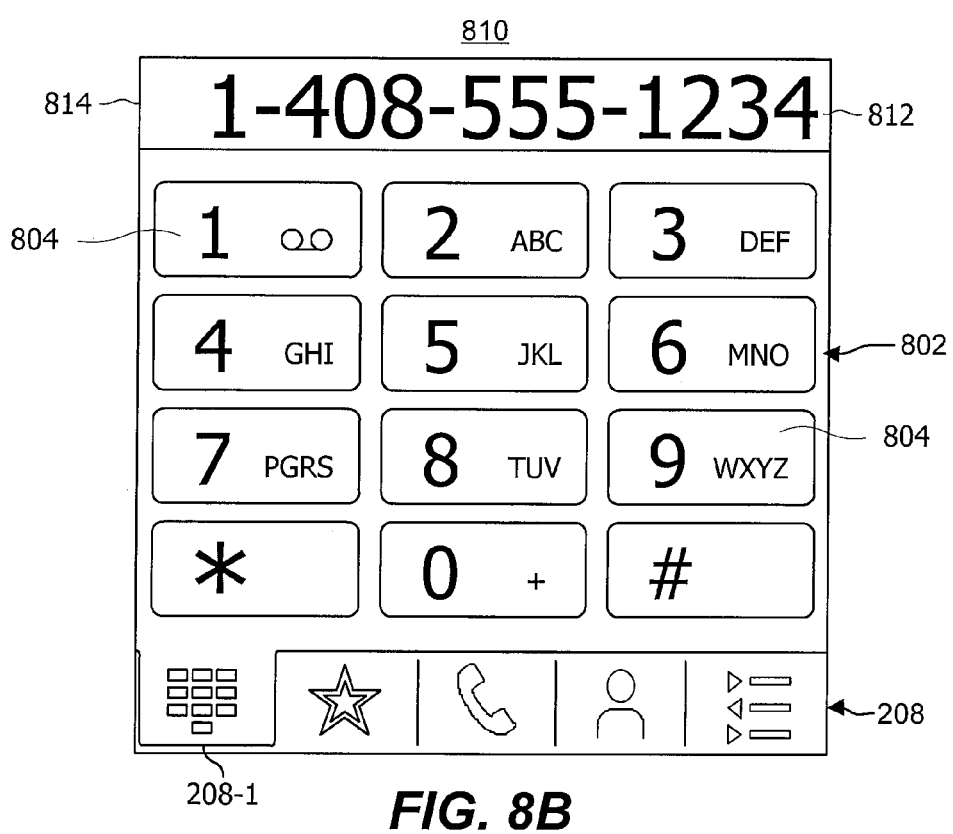
Figure 8C:

FIGS. 8A-C illustrate various embodiments of dial pad views 800, 810, 820. With reference to FIG. 8A, a dial pad view 800 is displayed when the dial pad tab 208-1 is highlighted (e.g., selected) on the navigation bar 208. The dial pad view 800 displays a dial pad 802 and enables number-based dialing on the display 138. Accordingly, selecting the dial pad tab 208-1 displays the dial pad view 800. The dial pad view 800 displays an alpha-numeric virtual telephone dial keypad 802 comprising soft keys 804. While in dial pad view 800, if the 'Typing dials Phone number' feature is enabled, entering a telephony character will switch the user to the dial pad view 800 with the first digit appearing in the title bar. Otherwise, if 'Typing starts Contact search' is enabled, typing any letter key (other then 0) switches the user out of the main view 200 to the contacts view 1600 (FIG. 16).

The dial pad view 800 displays a title bar 814 that includes information associated with the telephone, carrier, and voicemail, among others. The dial pad view 800 provides the virtual keypad 802 for number entry and for pasting numbers from the clipboard as well as a mechanism for entering dual tone multiple frequency (DTMF) tones after a call is active. The dial pad view 800 may be launched from any of the main telephone application views by tapping or selecting the dial pad tab 208-1 on the telephone navigation bar 208. To support dialing DTMF tones based on words/letters that requires a virtual keypad, a dial pad button may be presented on the active call screen user interface.

The dial pad view 800 may vary based on the underlying wireless carrier technology. For example, although GSM and CDMA dial pads are virtually identical, there may be minor differences between them. For example, FIGS. 8A and 8B illustrate respective GSM dial pad views 800, 810. The GSM dial pad view 800 provides a tape roll 806 for the voicemail icon. When there is no call in progress, the GSM dial pad view 800 displays the "Wireless Carrier" text 808.

FIG. 8B illustrates a GSM dial pad view 810 that is displayed when a call is in progress. In this mode, the GSM dial pad view 800 displays a dial string 812 comprising the phone number 1-408-555-1234 associated with the call in progress in the title bar 814 located above the dial pad 802.

FIG. 8C illustrates a CDMA dial pad view 820. The CDMA dial pad view 820 displays an alpha-numeric virtual telephone dial keypad 822 comprising soft keys 824. A title bar 826 comprises the name of the "Wireless Carrier" 828. The CDMA dial pad view 820 comprises an envelope 830 for the voice mail icon.

In any of the dial pad views 800, 810, 820, there is no default focus when entering the particular view. For example, with reference to the GSM dial pad view 800, a focus may be placed within a phone number when the user edits the phone number using a stylus. A user may navigate within the GSM dial pad view 800 by using the up key 122-3 on the 5-way navigation button 122 to place the focus any of the icons present in the respective title bars 814, 826. With respect to the GSM dial pad view 800, the right/left keys 122-2/122-1 of the 5-way navigation button 122 allow the user to change views if the focus is not placed within the dial string 812 (e.g., phone number) being edited in the title bar 814. If the focus is within the dial string 812 in the title bar 814, a key press of the down key 122-4 moves the focus out of the title bar 814, allowing the user to use right/left keys 122-2/122-1 to change views. The numeric buttons 804, however, may not receive the focus. QWERTY input goes directly to a text field (no cursor). The alphanumeric keyboard 104 controls may be used to dial a phone number. The send button 110 may be used to dial the dial string 812 phone number entered in the title bar 814, otherwise pressing the send button 110 brings up the redial list 350 (FIG. 3B). Pressing the center key 122-5 brings up a dial dialog view if there is a phone number entered in the dial string 812, otherwise it displays the last number dialed in the title bar 814. If the alphanumeric keyboard 104 is locked, then tapping on the 'Return'/'Spacebar' key on the alphanumeric keyboard 104 will not dial the phone number in the dial string 812. If no number is displayed in the title bar 814, pressing the return or space key in the alphanumeric keyboard 104 may load the previous number dialed by the dial pad 802 into the number display. This action may not dial the previous number. Pressing the return or spacebar key in the alphanumeric keyboard 104 again should no longer dial the loaded number. Pressing the send button 110 should dial the phone number loaded in the dial string 812 in the title bar 814. The left and right navigation keys 122-1 and 122-2 move the insertion point within the dial string 812 when the insertion point is visible. Pressing the down key 122-4 moves the focus out from the title bar 814, or alternately the user can press the right key 122-1 at the end of the dial string 812 to move the focus out from the title bar 814 so that the left navigation key 122-1 and the right navigation key 122-2 can be used to change views. Pressing the backspace deletes entries within the dial string 812.

In one embodiment, one-touch voice mail dialing may be achieved by pressing and holding down the '1' button for a predetermined period (e.g., approximately one second) on the alphanumeric keyboard 104. This automatically dials the voice mail number of the user. This feature may be supported in any of the main phone application views invoked using the navigation bar 208.

During an active call, the user may dial DTMF tones via the dial pad view 800, 810, 820 or initiate a second call. When the first call is active, the user can dial DTMF tones from the dial pad view 800, 810, 820. The call in progress may remain active and does not have to be placed on hold. The user may navigate back to the active call screen using the phone application key 114, for example.

Favorites View

FIG. 9 illustrates one embodiment of a favorites view 900 that may be activated using the favorites tab 208-2 on the navigation bar 208. As shown in FIG. 9, when the favorites view 900 is displayed, the favorites tab 208-2 is highlighted (e.g., selected) on the navigation bar 208. The basic layout of the favorites view 900 comprises a title bar 902, a single column of favorites buttons 904 (e.g., favorites buttons 904-1-7), and the navigation bar 208. The title bar 902 may be similar to the title bar 202 specified in the telephone user interface main view 200. Although seven favorites buttons 904 are shown in FIG. 9, additional and/or fewer favorites buttons 904 may be created. The favorites buttons 904 correspond to a list of favorites items 906. The list of favorites items 906 may comprise favorites items 906-1-7. The favorites buttons 904-1-7 each may be identified by a different icon.

The default focus may be on the first item in the list of favorites items 906 (e.g., the voicemail favorites item 906-1 corresponding to the first favorites button 904-1). The favorites view 900 may comprise a single column layout and may support page scrolling mode. The up key 122-3 and the down key 122-4 may be employed to move the focus between the favorite buttons 904-1-7, for example. If the focus is on the first favorites button 904-1 (as shown in FIG. 9), pressing the up key 122-3 places the focus on the voicemail icon identifying the favorites button 904-1 if the user has a new voicemail. When the last favorites button 904-7 on a page is selected, pressing the down key 122-4 displays the next page of favorite items with the last favorite button 904-7 of the previous page at the top.

The favorites view 900 displays the list of favorites 906 that may be associated with application specific shortcuts, links to specific universal resource locators (URLs) or files (e.g., extensible or otherwise), and/or speed dials, for example. For example, in one embodiment, the favorites items in the favorites list 906 may be shortcuts to applications. In one embodiment, the list of favorites items 906 may comprise, for example, voicemail 906-1, news and entertainment 906-2, software downloads 906-3, get ring tones 906-4, Bluetooth 906-5, camera 906-6, and tutorial 906-7. The user may execute any of the shortcuts to applications, URLs, e'mail, messaging, and speed dials, among others, such as voicemail, news and entertainment, software downloads, get ring tones, Bluetooth, camera, and tutorial, by selecting and clicking the following corresponding favorites buttons voicemail button 904-1, news and entertainment button 904-2, software downloads button 904-3, get ring tones button 904-4, Bluetooth button 904-5, camera button 904-6, and tutorial button 904-7. Additional favorites items may be displayed in the favorites items list 906 such as, for example, albums, slide shows, playlists, world wide web (web), messaging, MP3 player, e'mail, search engines (e.g., Google®), web favorite to Google®, smart phone portals (e.g., Treo® Mobile Portal, Web Favorite to Palm™ Mobile Portal), and other subsets of application specific content. Any of the items displayed in the favorites items list 906 may be invoked by selecting the respective favorite buttons 904-1-7, for example, and may be identified by icons. The favorites items list 906 may be located in a separate view from the telephone user interface main view 200.

The favorites items in the favorites items list 906 may be carrierizable (i.e., may be customized according to a specific wireless carrier). This means that a wireless carrier can specify a default set of favorites buttons 904-1-7. Additionally, the wireless carrier may request that a given favorites button 904-1-7 be locked such that the button cannot be modified or deleted. The favorites items list 906 may be arranged in the single column 904 and a user may be able to move a favorites item to a different position in the column 904.

The favorites view 900 may be accessed via the keyboard 104. The center key 122-5 of the navigation button 122 may be pressed to execute a selected favorites button 904-1-7. In various embodiments, this may comprise dialing a speed dial, composing a pre-addressed SMS or e'mail, launching an application, or browsing a URL, for example. For speed dial favorites, for example, a speed dial number may be dialed by pressing the send key 110. If there is a label but no phone number specified for a speed dial favorite, pressing the send key 110 or the center key 122-5 when it is highlighted may display a dialog box that informs the user that no phone number is associated with the selected button, for example.

Figure 10A:
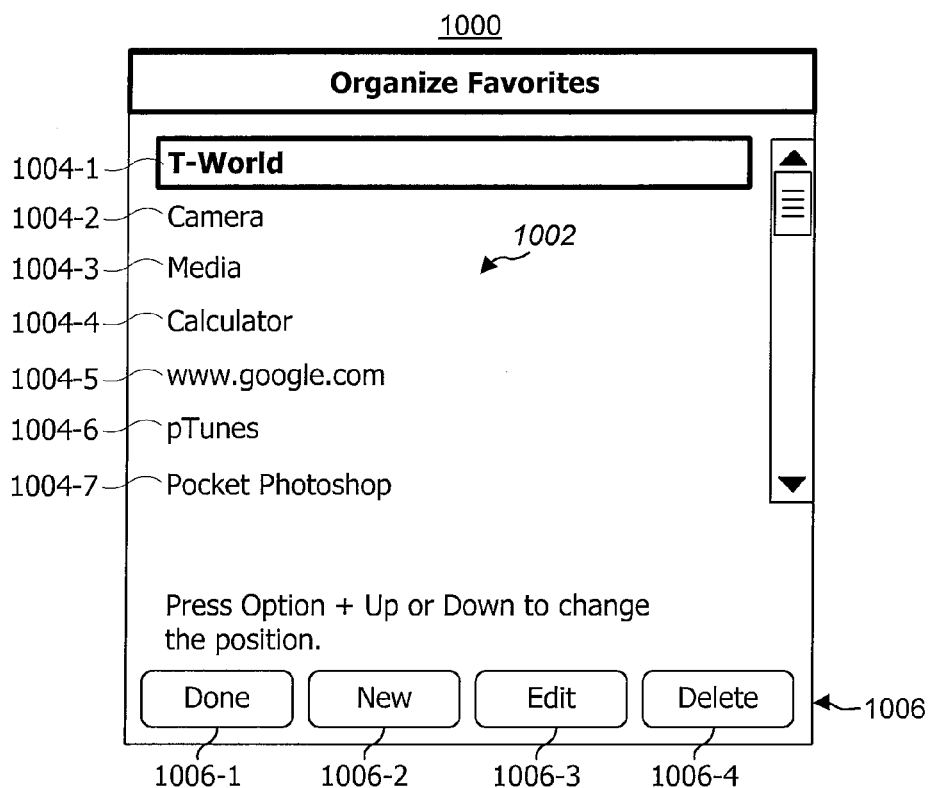
FIG. 10A illustrates one embodiment of a organize favorites dialog box.

FIG. 10A illustrates one embodiment of an organize favorites dialog box 1000. The organize favorites dialog box 1000 may be accessed through the menu panel under record. The organize favorites dialog box 1000 provides a scrolling list 1002 of favorites. In the embodiment illustrated in FIG. 10A, the scrolling list 1002 of favorites comprises T-World favorite 1004-1 (shown highlighted in FIG. 10A), a camera favorite 1004-2, a calculator favorite 1004-3, a google.com link favorite 1004-5, a pTunes favorite 1004-6, and a pocket photoshop favorite 1006-7. Others favorites may be user selectable.

The organize favorites dialog box 1000 also comprises a series of buttons 1006. For example, in the illustrated embodiment, the organize favorites dialog box 1000 comprises a done button 1006-1, a new button 1006-2, an edit button 1006-3, and a delete button 1006-4. The done button 1006-1 closes the organize favorites dialog box 1000 and displays the main favorites view 900 (FIG. 9).

The organize favorites dialog box 1000 is navigable via the navigation button 122. The primary focus may be on the done button 1006-1 and the secondary focus may be on the first favorite button by default, e.g., the T-World favorite 1004-1. The favorites in the list 1002 may be reorganized by highlighting the favorite to be moved and pressing various keyboard commands such as Option+Up to move it up one position, or pressing Option+Down to move it down one position. A favorite also may be selecting for editing by tapping on the favorite 1004-1-7 with a stylus or pressing the center button 122-5 when the favorite is highlighted.

Figure 10B:
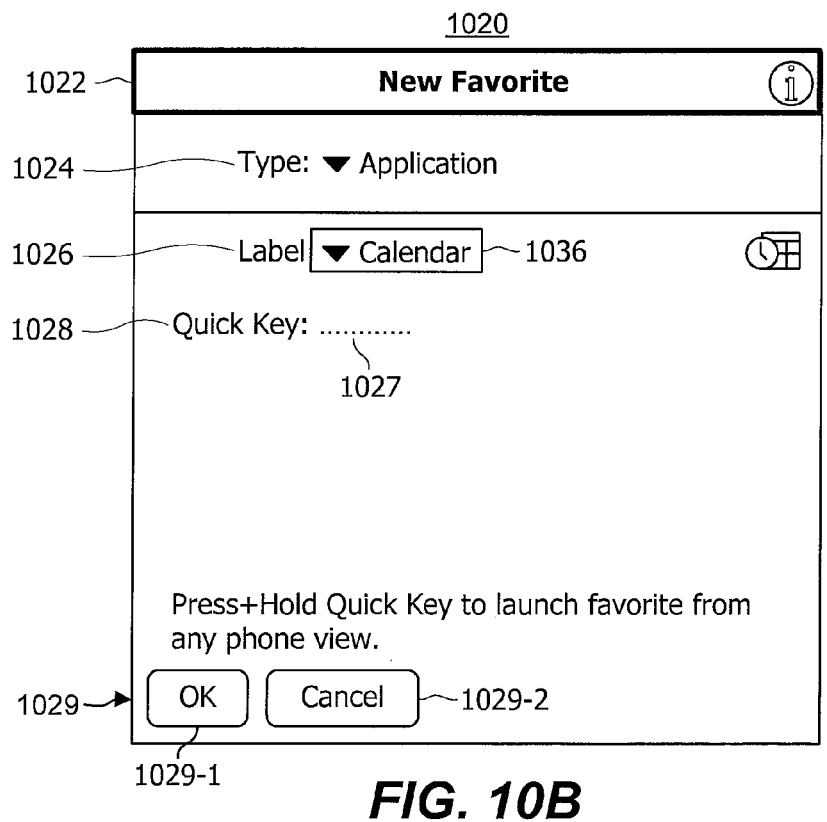
FIG. 10B illustrates one embodiment of a new favorites dialog box.

FIG. 10B illustrates one embodiment of a new favorites dialog box 1020. The new button 1006-2 opens a new favorite dialog box 1020 to create a new favorite. When a new favorite is created, it may be inserted in the position below the favorite that is highlighted (e.g., the T-World favorite 1004-1) in the organize favorites dialog box 1000 and the highlight shifts to the new favorite. The favorites below the highlighted favorite then will shift down one position. The new favorites dialog box 1020 may comprise a types list comprising applications, speed dials, message, e'mail, and web link, for example. The new favorites dialog box 1020 may comprise a title box 1022, a favorite type pick list 1024, a label field 1026, and a quick key 1028. The label field 1026 may comprise a label pick list 1036. The new favorites dialog box 1020 may comprise a series of buttons 1029 including an OK button 1029-1 and a cancel button 1029-2. The new favorites dialog box 1020 may comprise additional or fewer buttons.

Figure 10C:
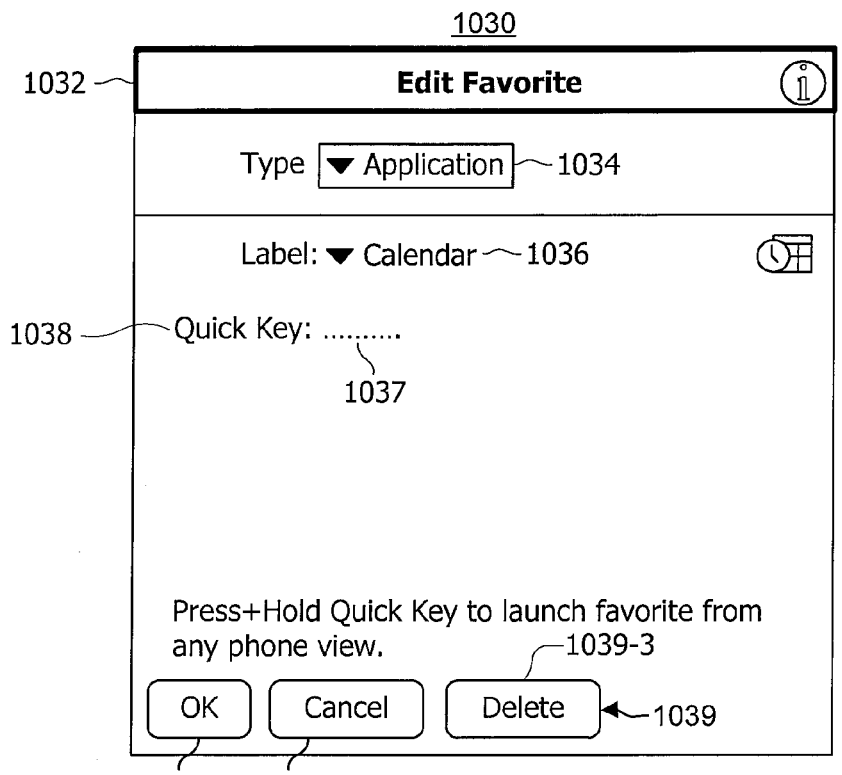
FIG. 10C illustrates one embodiment of an edit favorites dialog box.

FIG. 10C illustrates one embodiment of an edit favorites dialog box 1030. The edit button 1006-3 opens an edit favorites dialog box 1030 for the highlighted favorite. The delete button 1006-4 deletes a favorite in the list 1002. When a favorite is deleted, the favorites below it get shifted up a position in the list 1002. The edit favorites dialog box 1030 also may comprise a title box 1032, a favorite type pick list 1034, the label pick list 1036, and a quick key 1038 with a slightly different user interface (UI). The edit favorites dialog box 1030 may comprise a series of buttons 1039 including an OK button 1030-1, a cancel button 1030-2, and a delete button 1030-3. The edit favorite dialog box 1030 may comprise additional or fewer buttons. For example, as shown below in FIGS. 10A-C, the edit favorites dialog box 1030 may comprise a more button.

The title boxes 1022, 1032 for the respective new favorites dialog box 1020 and the edit favorites dialog box 1032 may comprise similar functionality with the exception of the delete button 1039-3 in the edit favorites dialog box 1032. The type pick lists 1024, 1034 may comprise a speed dial favorite, an e'mail favorite, an SMS/messaging favorite, an application favorites, and a web favorite, among others. The pick lists 1024, 1034 display the options for shortcut button types such as, for example, application changes to the UI on the screen to display UI specific for selecting applicants, in addition to speed dial, message, e'mail, and/or web link. A default favorite type remains speed dial. The quick keys 1028, 1038 provide respective text fields 1027, 1037 that allows the user to assign a QWERTY shortcut key associated with the favorite button. The quick keys 1028, 1038 function from the favorites view 900, main view 200, and dial pad views 800, 810, 820 on press and hold.

The favorites buttons 904 (FIG. 9) in the favorites view 900 (FIG. 9) allow for quick and easy access to the user's favorite people, applications, or web sites. The user may create multiple different new types of favorites within the new favorites view 1020 or may edit existing favorites within the edit favorites view 1030. In one embodiment, for example, the user may create five different types of favorites buttons for: (1) frequently called numbers (speed dial); (2) favorite applications (application); (3) frequently messaged numbers (message); (4) frequently emailed contacts (e'mail); and/or (5) favorite web sites (web link). Each of these different types of favorites are described below.

Figure 11A:
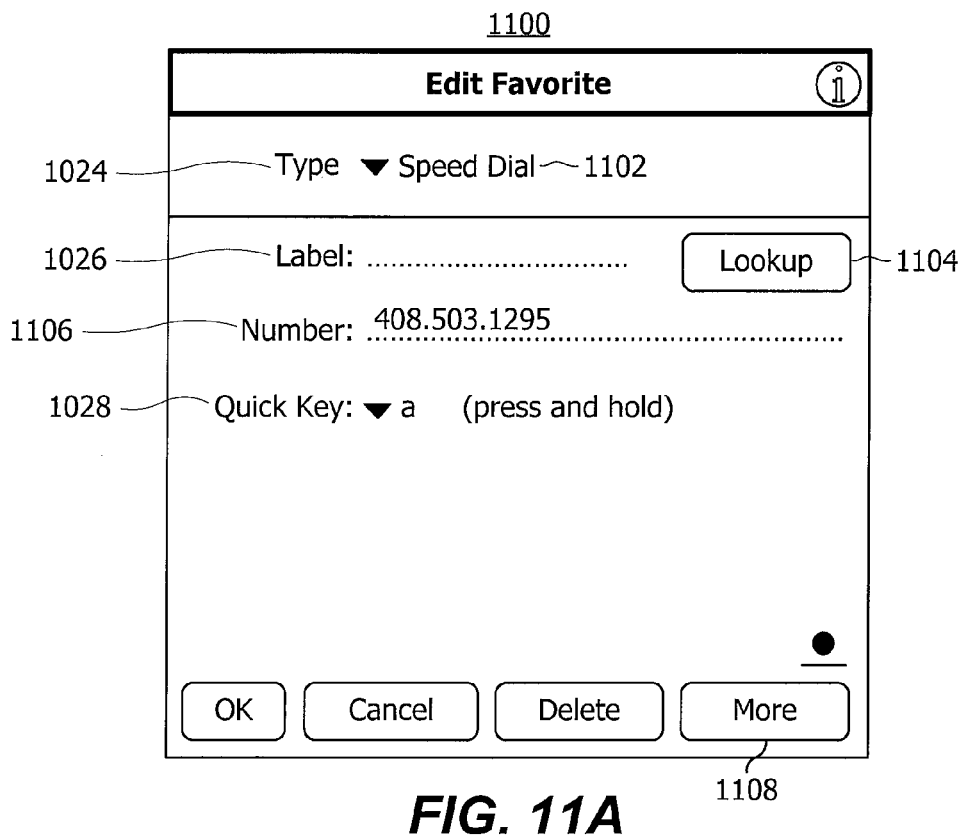
FIGS. 11A-B illustrate various embodiments of views associated with the speed dial favorite within the edit favorite dialog box.
Figure 11B:
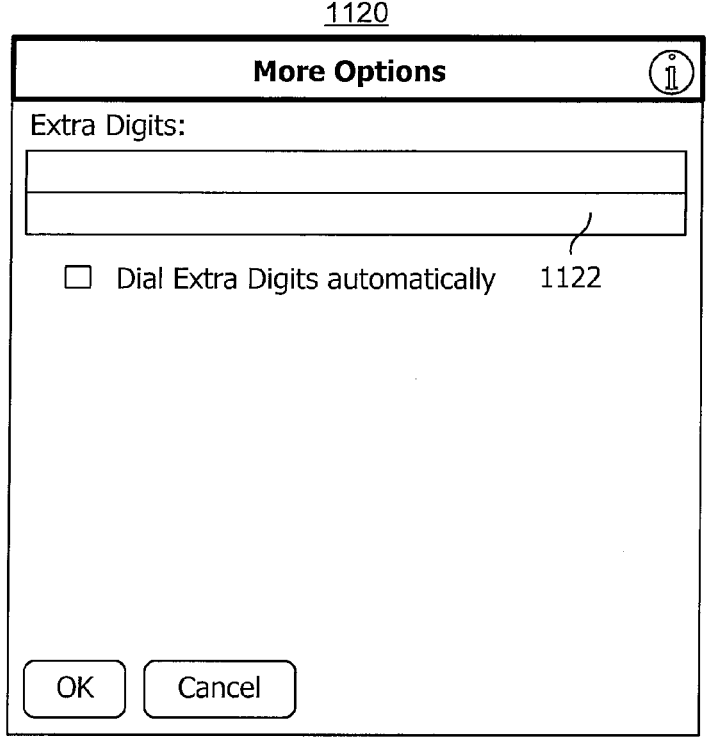

FIGS. 11A-B illustrate various embodiments of views associated with the speed dial favorite within the edit favorites dialog box 1030. FIG. 11A illustrates one embodiment of an edit favorites view 1100. Accordingly, for frequently called numbers, the user may select speed dial 1102 from the type pick list 1034. The user may select lookup 1104 to locate the number of someone in their contacts list and automatically populate the label field 1036 and a number field 1106. The up/down keys 122-3/122-4 may be used to locate the number and pressing the center key 122-5 selects the number. Otherwise, a name and a mobile number may be entered into the label field 1026 and the number field 1106.

FIG. 11B illustrates one embodiment of a more options view 1120 when extra digits may be required. If extra digits are required after a call is connected, the user may the more button 1108 (FIG. 11A) and may specify any extra digits (0-9, #, or *) to be dialed automatically after a two-second pause or when prompted in the extra digits field 1122.

Figure 12:
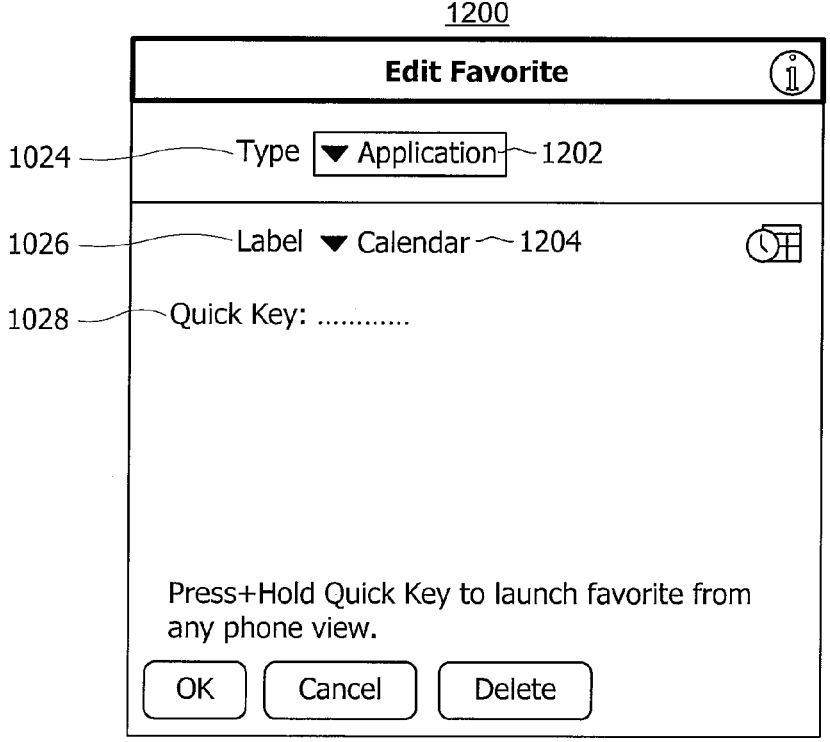
FIG. 12 illustrates one embodiment of an application type edit favorites view.

FIG. 12 illustrates one embodiment of an application type edit favorites view 1200. For frequently used applications, the user may select application 1202 from the type pick list 1034. In the label pick list 1036, the user may press the center key 122-5 to view a list of their applications. In the label pick list 1036, the application selected is a calendar application 1204. The up/down keys 122-3/122-4 may be used to locate an application and pressing the center key 122-5 to select it.

Figure 13:
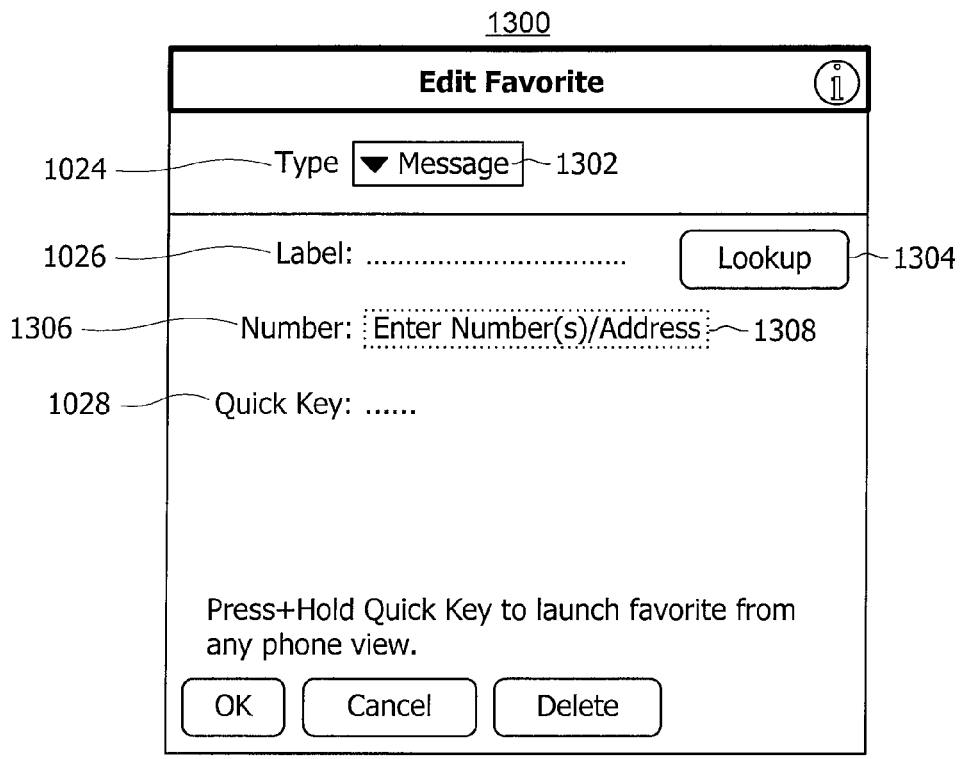
FIG. 13 illustrates one embodiment of a message type edit favorites view.

FIG. 13 illustrates one embodiment of a message type edit favorites view 1300. The message type edit favorites view 1300 enables users that frequently sends text messages to select message 1302 from the type pick list 1034 and enter frequently used numbers or e'mail addresses 1308 into a number field 1306. The user then may select lookup button 1304 to locate the number of someone in their contact list and automatically populate the label field 1036 and the number field 1306. The up/down keys 122-3/122-4 may be used to locate the number and pressing the center key 122-5 to select it. Otherwise, the user may enter a name and mobile number into the label field 1036 and the number field 1306. The e'mail addresses 1308 may be entered in the number field 1306. A group message button may be created by entering multiple phone numbers or email addresses separated by commas in the number field 1306.

Figure 14:
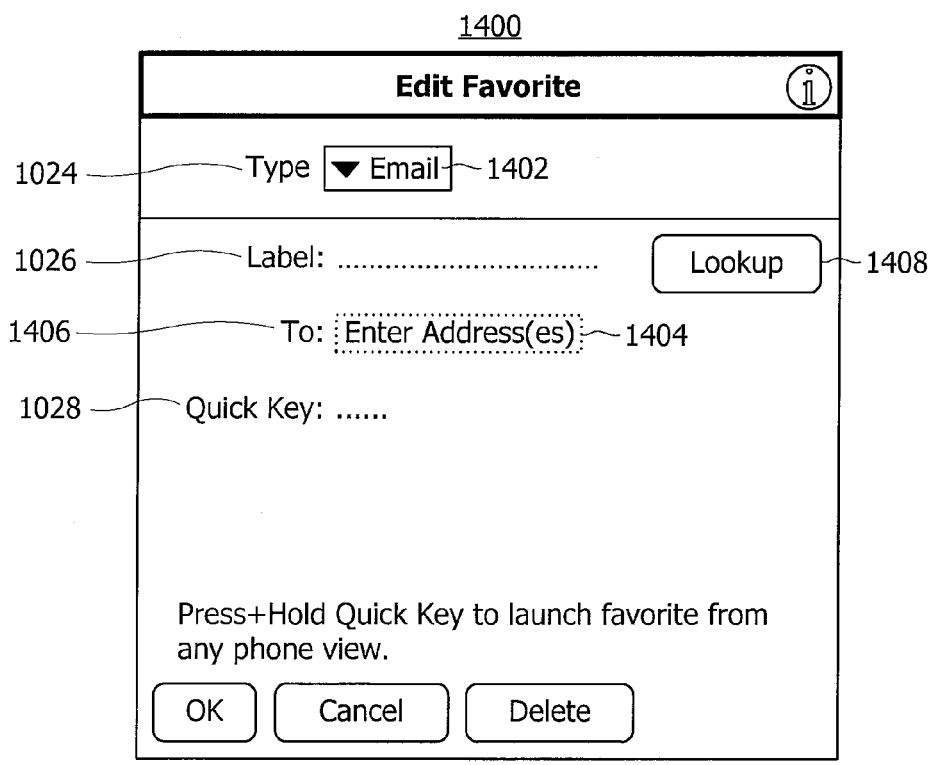
FIG. 14 illustrates one embodiment of an e'mail type edit favorites view.

FIG. 14 illustrates one embodiment of an e'mail type edit favorites view 1400. The e'mail type edit favorites view 1400 enables users that frequently send e'mail to select e'mail 1402 from the type pick list 1034 and enter frequently used e'mail addresses 1404 into an address to field 1406. The lookup button 1408 may be selected to locate the e'mail address in the contact list and automatically populate the label field 1036 and the address to field 1406. The up/down keys 122-3/122-4 may be used to locate the number and pressing the center key 122-5 to select it. A group e'mail button may be created by entering multiple e'mail addresses separated by commas in the address to field 1406.

Figure 15:
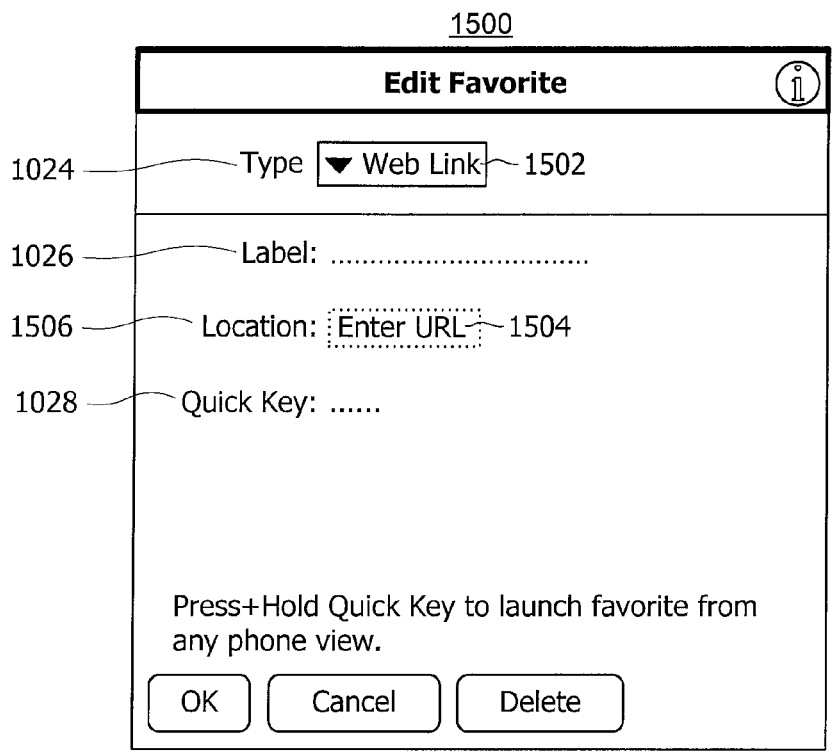
FIG. 15 illustrates one embodiment of a web link edit favorites view.

FIG. 15 illustrates one embodiment of a web link edit favorites view 1500. The web link edit favorites view 1500 enables users that frequently accesses web sites to select a web link 1502 from the type pick list 1034 and enter frequently used URLs 1504 into a location field 1506. The frequently used web links 1502 may be selected from type pick list 1034. A button name for the web favorite may be entered in the label field 1036. The URL 1504 for the web page may be entered in the location field 1506.

Each of the quick keys 1038 in the various edit favorites views 1030, 1100, 1200, 1300, 1400, 1500 described above allow for quick and easy access to favorite contacts, applications or web sites from within any of the tabs on the navigation bar 208 such (e.g., the dial pad tab 208-1, the favorites tab 208-2, the main telephone application tab 208-3, the contacts tab 208-4, and the call log tab 208-5). To use the quick keys 1028 the user may press and hold the key assigned to a specific favorite button, for example.

Contacts View

FIG. 16 illustrates one embodiment of a contacts view 1600 that is displayed when the contacts tab 208-4 is highlighted on the navigation bar 208. The contacts view comprises a title bar 1602 and a category pop-up menu. Initially, the category pop-up menu 1604 loads as an "All" category view 1604 that comprises a contacts list 1606 of every contact entry 1608 stored in the wireless device 100 memory. In one embodiment, the title bar 1602 may be the same as the title bar 202 on the telephone user interface main view 200. The title bar 1602 may accept text entries for instant lookup. Also, the backspace key on the keyboard 104 may be used to delete text entries from the title bar 1602.

The contacts view 1600 displays the contacts list 1606 comprising information for lookup and dialing as well as displaying an inventory of incoming and outgoing calls. In the contacts view 1600, the user may perform certain functionalities to see everyone in their contacts list 1606, view/edit an individual contact entry 1608, and call or SMS someone in the contacts list 1606. The contacts view 1600 provides an interface for traditional address book tasks as well as enhanced dial-from-the-address book direct dialing.

The contacts view 1600 functions in a manner similar to an address book application. This may include all address book contact entry 1608 viewing, editing, and managing. The contacts view 1600 functionality may be integrated such that a user may navigate to the contacts view 1600 to display the contacts list 1606 user interface without launching an additional application (e.g., without launching a separate contacts application). This feature may reduce screen flicker and enhance the user experience with the contacts view 1600 user interface. Further, this may enable the user to return to the main telephone application of the wireless device 100 after editing or adding a new contact entry 1608 to the contacts list 1606. Several components of contacts integration in the contacts view 1600 may comprise, for example, the integration of the contacts list 1606 into the contacts view 1600, the integration of commonly used dialogs (New/Edit Contact, Contact Details) into the contacts view 1600 so that selecting the done button returns the user to the contacts view 1600 rather than the contacts application, and the integration of all other dialogs that may be currently accessed from the contacts list 1606 in the contacts view 1600.

The contacts list 1606 may be sorted in accordance with various criteria based on user preference. Examples of sorting criteria may comprise: (1) Last Name, First Name; and (2) Company, Last Name. The names of the contacts records 1604 in the contacts list 1606 may be displayed on their own line. If the sorting option is Last Name, First Name, the name is displayed <Last Name>, <First Name> (i.e., Smith, Bob). If the sorting option is Company, Last Name, the name is displayed <Company> <Last Name>-no comma (i.e., Palm Smith).

A note icon 1610 is displayed in the contacts view 1600 if there is a note associated with the contact entry 1608 currently displayed. In one embodiment, the note icon 1610 may be displayed to the left of the scroll bar 1612, right justified and on the same line as the name of the contacts entry 1608. The note icon 1610 does not necessarily change size or boldness when different fonts are selected. All telephony-relevant numbers 1614 may be displayed in the main contacts view 1600 as the contacts list 1606. The numbers 1614 are each displayed on their own line to form a list.

When the contacts view 1600 is initially invoked, the default focus is on the first phone number 1614. When the contacts view tab 208-4 is selected, all of the entries 1608 in the address book are displayed and are sorted by the sort option provided in the preferences. The first phone number 1614 of the first entry 1608 on the page is automatically highlighted. If no name is provided for an entry, the text "-Unnamed-" is displayed for the name field.

Figure 17:
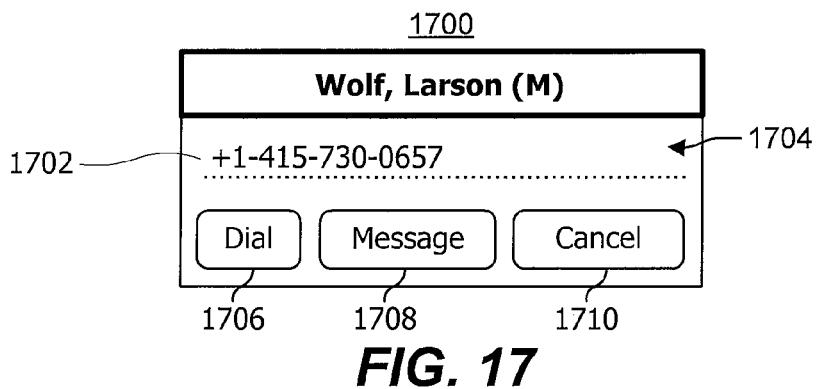
FIG. 17 illustrates one embodiment of a dial dialog box.

FIG. 17 illustrates one embodiment of a dial dialog box 1700. The keyboard 104 may be used to control functions within the contacts view 1600. For example, pressing the send key 110 will dial the highlighted number immediately if the highlight is on the number. Pressing the center key 122-5 of the navigation button 122 invokes a dial dialog box 1700 as shown in FIG. 17. The dial dialog box 1700 allows the user to dial or SMS if the highlight is on the number 1702. For example, the user may select the dial button 1706 to dial the number 1702 in the dial field 1704. To send an SMS, the user may select the message button 1708. The cancel button 1710 cancels a current operation, exits the dial dialog box 1700, and returns to the contacts view 1600. If the highlight is placed on a name in the contacts view 1600, the record is opened into a non-editable record view or other record identifier, like the name of the company, for example.

Figure 18:
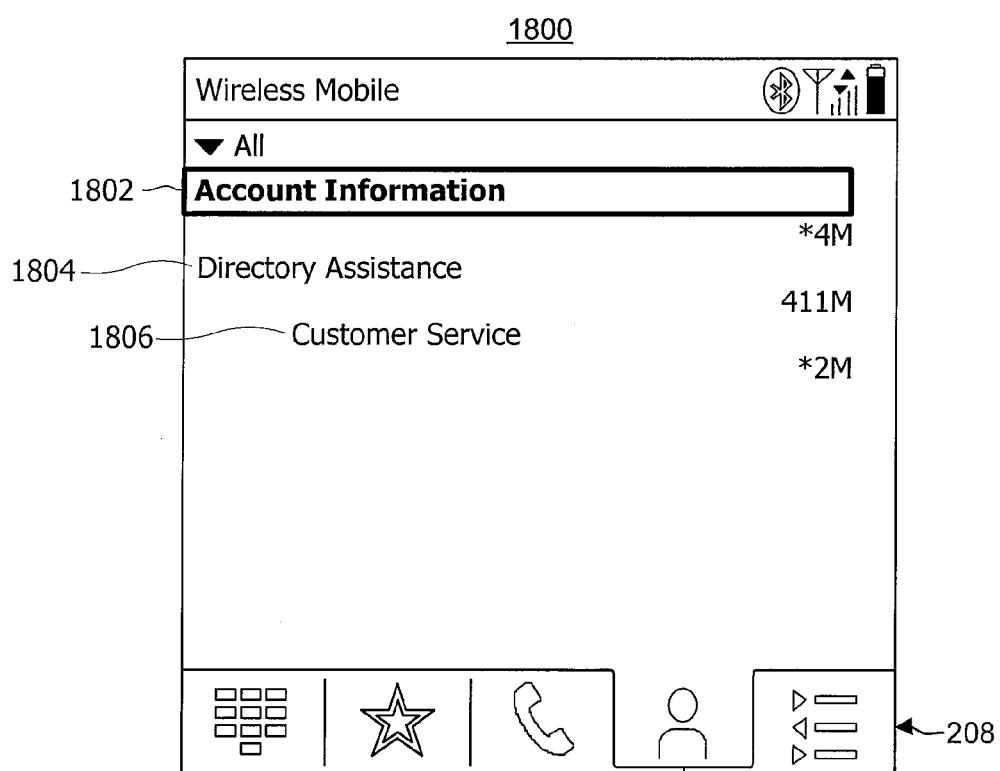
FIG. 18 illustrates one embodiment of a default contacts view.

FIG. 18 illustrates one embodiment of a default contacts view 1800. When a user navigates to the default contacts view 1800 for the first time, elements associated with carrier specific contacts are displayed. These may comprise account information 1802, directory assistance 1804, and carrier customer service 1806, for example. In various embodiments, a carrier may specify multiple other default contacts. In one embodiment, the carrier may specify up to ten default contacts to be displayed in the default contacts view 1800.

Some menu items may perform functions on a highlighted contact in the contacts list 1606. These functions work whether the highlight is on the name portion of the contact entry 1608 or any of the numbers 1614. If the highlight is on any part of the contact entry 1608, then that contact is considered the highlighted contact.

Figure 19:
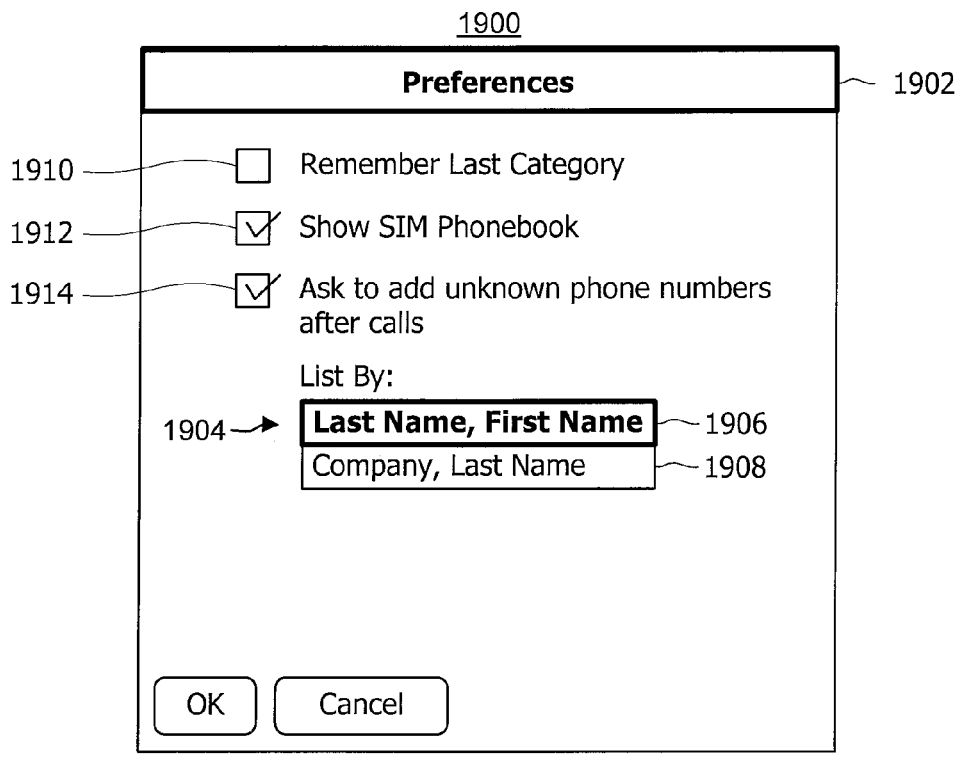
FIG. 19 illustrates one embodiment of a preferences view.

FIG. 19 illustrates one embodiment of a preferences view 1900 from an options menu. The heading or title bar 1902 is "Preferences." A "List By" box 1904 is displayed to select the sort options. A Last Name, First Name sort option 1906 and a Company, Last Name sort option 1908 is included. When the Company sort option 1908 is selected the name look up/instant look up contacts search filter supports first initial, last initial searches, first name searches and last name searched. In other embodiments, the company field may be added in the search last in the priority when matches are not made in the first name and last name fields. In one embodiment, the company field may be searched only when the first name and last name fields in a given record are empty. The company field may be added to the search, last in priority, even if first name and last name fields are populated for a given record, for example. As shown in FIG. 19, the Last Name, First Name sort option 1906 is the default sort option. A "Remember Last Category" checkbox 1910 is provided to allow users to return to the same category view they last viewed. For GSM based wireless devices 100, a "SIM Phonebook" checkbox 1912 is provided to allow users to display or hide a category in the contacts view 1800. As shown, the "SIM Phonebook" checkbox 1912 may be selected by default. A third checkbox 1914 is displayed to allow the user to select whether they want the post call number store dialog to be displayed when ending a call with a caller who is not in contacts list 1606. The text of the third checkbox 1914 reads "Ask to add unknown phone numbers after calls." The third checkbox 1914 may be is selected as a default. In one embodiment, e.g., for CDMA based wireless devices 100, the third checkbox 1914 may be located in a separate phone preferences panel.

Figure 20:
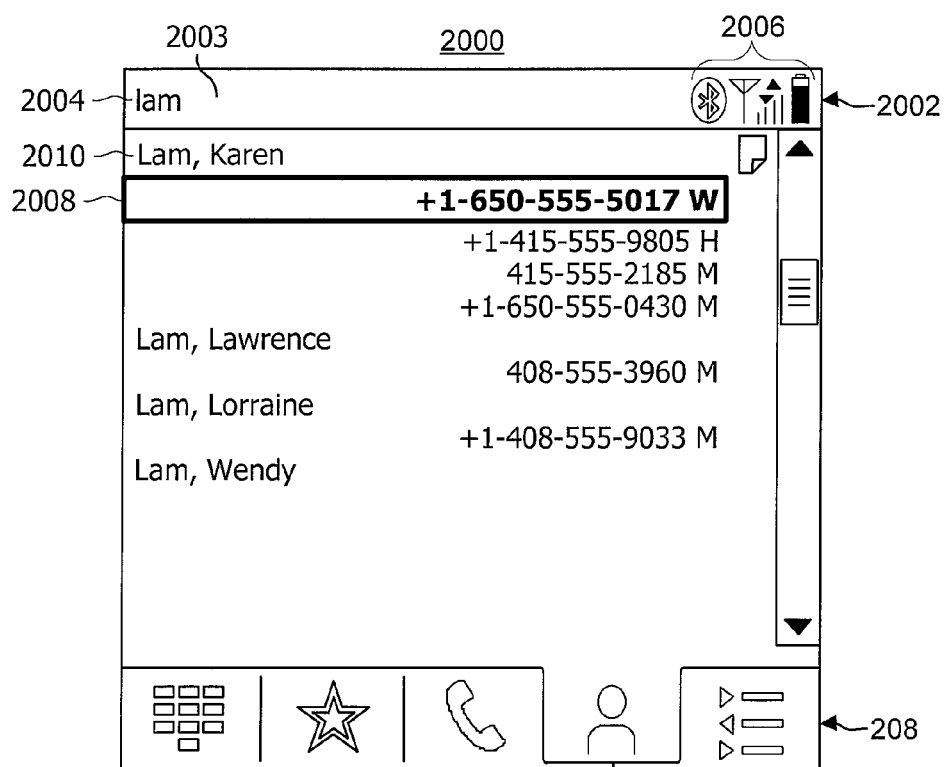
FIG. 20 illustrates one embodiment of a contacts view.

FIG. 20 illustrates one embodiment of a contacts view 2000. The contacts view 2000 comprises a title bar 2002 to display the user entered text 2004 (e.g., "1 am") in a look up field 2003 beginning on the left side of the title bar 2002. Through the contacts view 200, a user may look up contacts alphanumerically. An alphanumeric lookup refers to determining whether user key entries on the keyboard 104 are intended for dialing a number or performing a contacts search. The alphanumeric lookup allows the user to flexibly dial by name or number from the telephone user interface main view 200. The phone display options menu allows the user to search by starting to type the contacts. When this feature is selected, however, an alpha/instant lookup may be performed rather than an alphanumeric lookup. When the "Typing starts Contacts search" is enabled, any key (except for 0) entered by the user takes the user out of the telephone user interface main view 200 and into the contacts view 2000. The contacts view 200 title bar 2002 displays the user entered letters 2004 to the left of the title bar. The title bar 2002 gadgets 2006 continue to be displayed in the right-hand area of the title bar 2002. The focus defaults to the first number 2008 in the matched/closest matching contacts record 2010. In the case where a user attempts a contact search but no match is found, the user can navigate to the dial pad view 800 and dial the number using the dial pad 802.

The text 2004 entered in the title bar 2002 is filtered by a multi-filter. When the first letter is entered, all matches are displayed and all non-matches are filtered out. With every subsequent letter entered, all non-matches are filtered out. A "space" character may be used as a character to accommodate names with spaces. In these situations the space character is ignored for matching purposes. All matches for multiple criteria are displayed as previously described. When a character is deleted from the lookup field 2003, the filter expands back out to the search results for the new string. When the user backspaces back to a blank lookup field 2003, all records are displayed (e.g., the contacts view 200 returns to the same state as when it was first entered). The lookup logic searches for hits based on the displayed fields, which sometimes may be changed if there are blank fields. For example, if a record has blank name fields and a company entry, the lookup logic may generate a match on the company name, even if the wireless device 100 is in sort by name mode.

Figure 21:
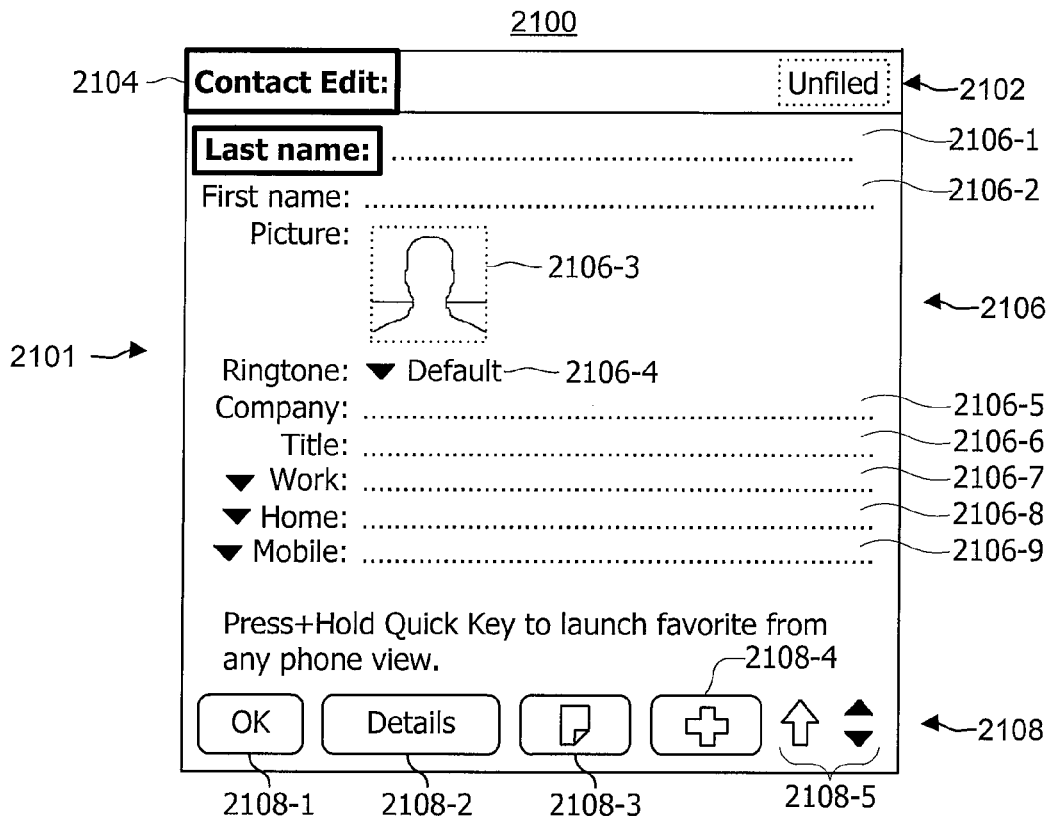
FIG. 21 illustrates one embodiment of a new/edit contact view.

FIG. 21 illustrates one embodiment of a new/edit contact view 2100. The new/edit contact view 2100 displays a single contact edit page 2101 for a particular contact. The new/edit contact view 2100 comprises a title bar 2102. The text 2104 provided in the title bar 2102 is the contact edit text. The new/edit contact view 2100 displays multiple fields 2106. In one embodiment, for example, the new/edit contact view 2100 may display a Last Name field 2106-1, a First Name field 2106-2, a Picture field 2106-3, a Ringtone field 2106-4, a Company field 2106-5, a Title field 2106-6, a Work number field 2106-7, a Home number field 2106-8, and a Mobile number field 2106-9. Any of the fields may be adapted to be text fields and/or drop-down menu fields. A field that is implemented as a drop-down menu field displays a pop-up list of user selectable choices to populate the field.

For navigation purposes, the default focus may be located on the Last Name field 2106-1, for example. The new/edit contact view 2100 also displays a series of buttons 2108. The done button 2108-1 accepts the information entered in the fields 2106. The details button 2108-2 displays any additional information available in any of the fields 2106. The page button 2108-3 scrolls one contact edit page 2101 at a time. The plus button 2108-4 may be used to add additional phone, address, email, or custom fields. The scroll arrows 2108-5 allow navigation between the fields 2106 in the new/edit contact view 2100 and/or the pop-up menu options. Names can be applied to more than one field, for example, a contact can have more than one work phone number.

Figure 22:
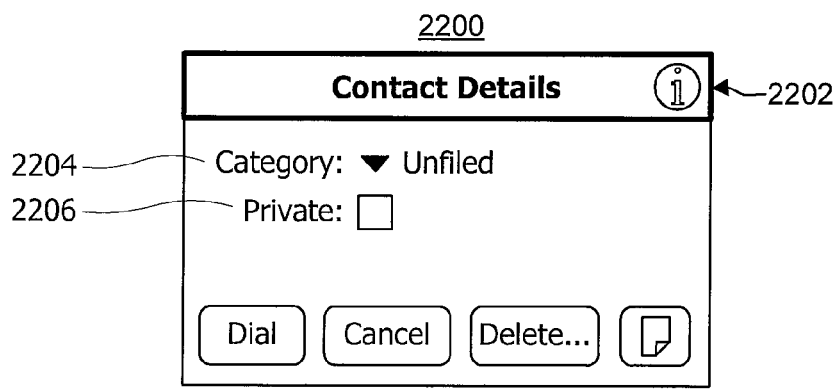
FIG. 22 illustrates one embodiment of new/edit record view details dialog box.

FIG. 22 illustrates one embodiment of new/edit record view details dialog box 2200. The new/edit record view details dialog box 2200 comprises a title bar 2202 including the text "Contacts Details." The new/edit record view details dialog box 2200 also comprises a category picklist drop-down list 2204 and private checkbox 2206. The choices in the category picklist drop-down list 2204 may comprise, for example: Business, Personal, QuickList, Unfiled, and Edit Categories.

Figure 23:
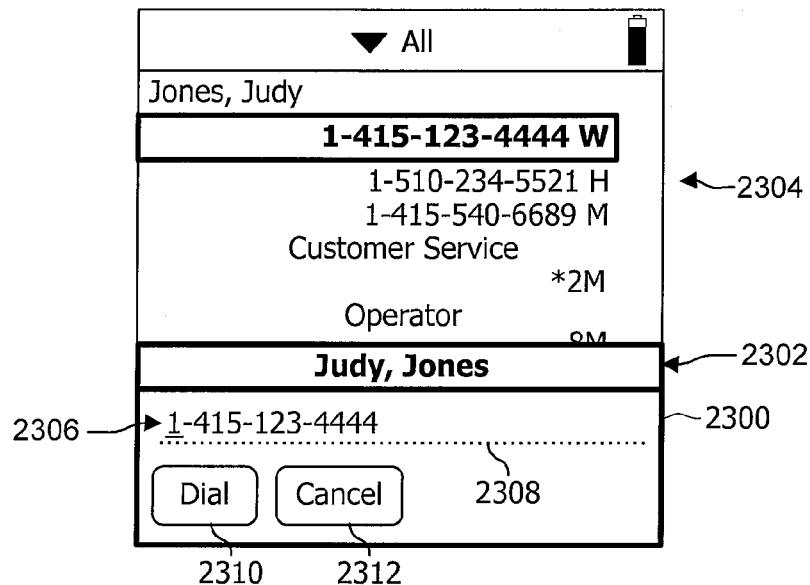
FIG. 23 illustrates one embodiment of a dial dialog box.

FIG. 23 illustrates one embodiment of a dial dialog box 2300. The dial dialog box 2300 comprises a title bar 2302 with text associated with the name of the contact being called. The name of the person being called, if available, may be formatted as 'First Last', and the phone number identifier (here W). Also, the title bar 2302 may comprise the company of the person being called if it is available and the name is not. Or, the title bar 2302 may comprise '-Unnamed-' is neither the contact name nor the contact's company is available. The dial dialog box 2300 is located at the bottom of the screen 2304. The cursor is placed automatically at the beginning of the number 2306 in the number field 2308. In his manner, the user may prep-pend dial digits. Tapping the dial button 2310 dials the number 2306. Tapping the cancel button 2312 returns the user to the previous view.

Call Log View

Figure 24:
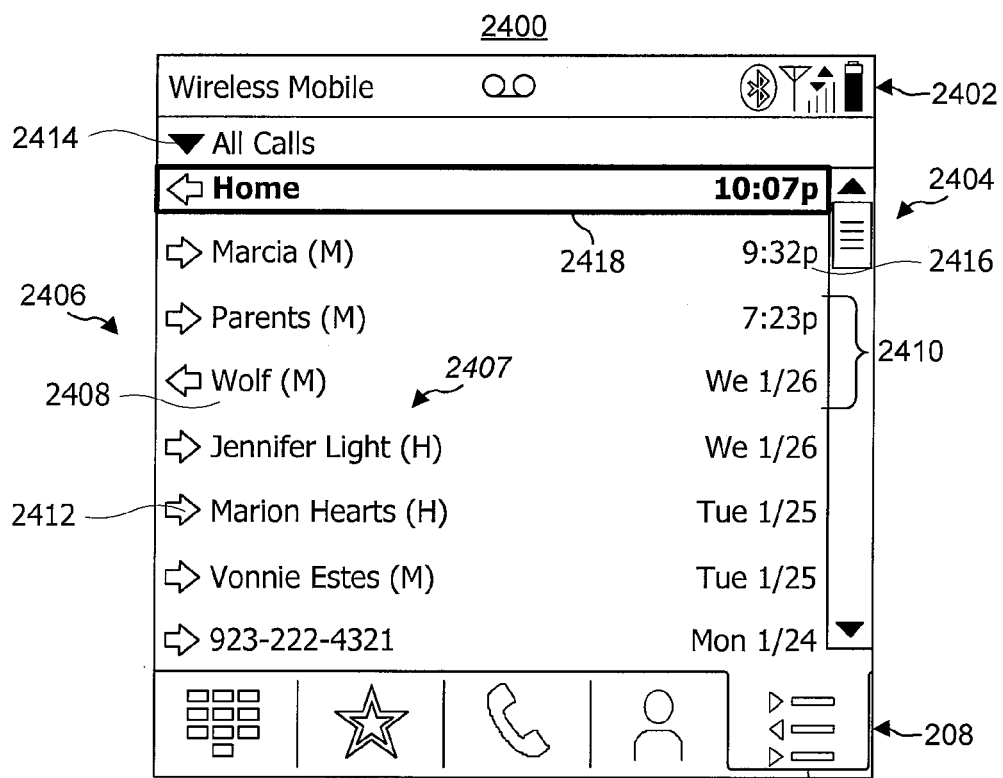
FIG. 24 illustrates one embodiment of a call log view.

FIG. 24 illustrates one embodiment of a call log view 2400. The call log view 2400 is displayed when the call log tab 208-5 is highlighted (e.g., selected) on the navigation bar 208. The call log is generated automatically as the user makes and receives phone calls. The call log view 2400 will display instructional copy when the user first powers up the wireless device 100 and navigates to the call log view 2400. The instructional copy will be removed and replaced with the call inventory once calls are made and/or received. The call log view 2400 comprises a title bar 2402. The title bar 2402 may be similar to the title bar 202 of the telephone user interface main view 200. The call log view 2400 comprises a content area 2404. The content area 2404 comprises a scrolling list view 2406 of call records 2407. Each call record 2407 may comprise a list of names 2408 or phone numbers, time or date 2410 of a call, and a call type icon 2412 indicating the kind of call it was, e.g., incoming, outgoing, or missed. A category pop-up menu 2414 may be located underneath the title bar 2402 flush to the edge. When popped-up, the menu 2414 grows to the right keeping left justified with the initial text of the pop-up menu 2414.

As previously discussed, the content area 2404 contains a scroll list 2406 of names or phone numbers 2408 and a time or date 2410 of a call. The call type icon 2412 indicates what kind of call it was, e.g., incoming, outgoing, or missed. The call type icon 2412 may be displayed to the left of the name or number field 2408. Incoming calls may be depicted with a right arrow, outgoing calls may be depicted with a left arrow, and missed and unanswered calls may be depicted with a grayed-out version of the appropriate arrow (e.g., either the incoming right arrow or the outgoing left arrow).

When a name match is made, the respective name is displayed in the list view 2406. A name match may be attempted against both the favorites and contacts list databases. When a name is not made, the name of the caller may be supplied by the network carrier and may be displayed in the list view 2406. Some carriers display the name and some may display both the name and number of the caller. If the carrier does not supply the name, then the number may be displayed in the list view. A "Blocked Caller ID" message may be displayed in the list view 2406 if the caller ID was unavailable because the incoming caller ID was blocked. Similarly, a "Restricted Caller ID" message may be displayed in the list view 2406 when the caller ID was unavailable because it was restricted.

The time of the call is displayed if the call occurred on the same day as the current date. Otherwise, the only the date of the call is displayed instead of the time. A small 'a' after the time designates AM and a small 'p' 2416 after the time designates PM if the time format is selected as a twelve hour format.

One call record 2407 is always selected. The first record 2418 may be selected when the call log view 2400 is entered. If the user scrolls past the first page, the first record on the subsequent page is selected. Pen down on a line selects that line and displays the dial dialog with that number in it.

The navigation in the call log view 2400 is similar to the navigation in the contacts view 1600 previously discussed. The up key 122-3 and the down key 122-4 moves the user through the call log list view 2406. The right key 122-2 and the left key 122-1 changes the current view to the dial pad view 800 and the contacts view 1600, respectively.

Actions within the call log view 2400 may be controlled via the keyboard 104. The send key 110 dials the number which has the focus if that number may be dialed, e.g., there is caller ID information available. If the number cannot be dialed, an audible beep is played. Pressing the center button 122-5 brings up the dial dialog box 2300 that allows the user to dial or SMS to the highlighted phone number.

A record menu enables the user to record calls from the call log list view 2406. Accordingly, the user may add a contact through the record menu, which appears only whenever a callback number is available and the highlighted/selected call log item in the call log list 2406 does not have a name match in the contacts database. This may also occur even if a name match is possible due to an entry in the favorites speed dial database. When selected, a dialog is displayed that asks whether the user would like to create a new contact or add to an existing one. The title of the dialog is the phone number that has focus.

A totals menu may be provided in the record menu to display the usage since the last reset, the total minutes usage on the home network, the total roaming minutes usage, the total minutes usage (i.e., home network usage plus roaming usage), kilobytes sent, kilobytes received, and total kilobytes (i.e., kilobytes sent plus kilobytes received). The totals menu option and duration in the call log details dialog may be hidden for carriers that specify that these items should be hidden.

Prepend dialing is supported as previously discussed with respect to the contact list. When a call back number is available with a call log record: tapping on the highlighted item or pressing the center key 122-5 will generate the dial dialog box 2300. Focus is on the dial button by default. Pressing the send key 110 automatically initiates the call. When the caller ID is not available with the call log record 2407: tapping on the highlighted item, or pressing the send 110 or the center key 122-5 will do nothing. Because the text messaging to landline numbers are being increasingly deployed by carriers, a message button may be provided in the dial dialog box 2300 for any phone number whether or not it has a 'Mobile' label.

Figure 25A:
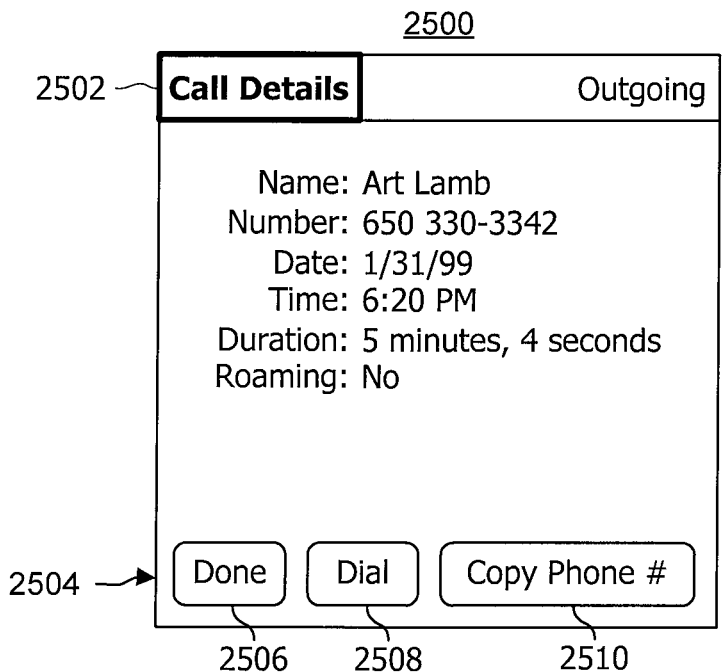
FIGS. 25A-B illustrate embodiments of respective detail views.
Figure 25B:
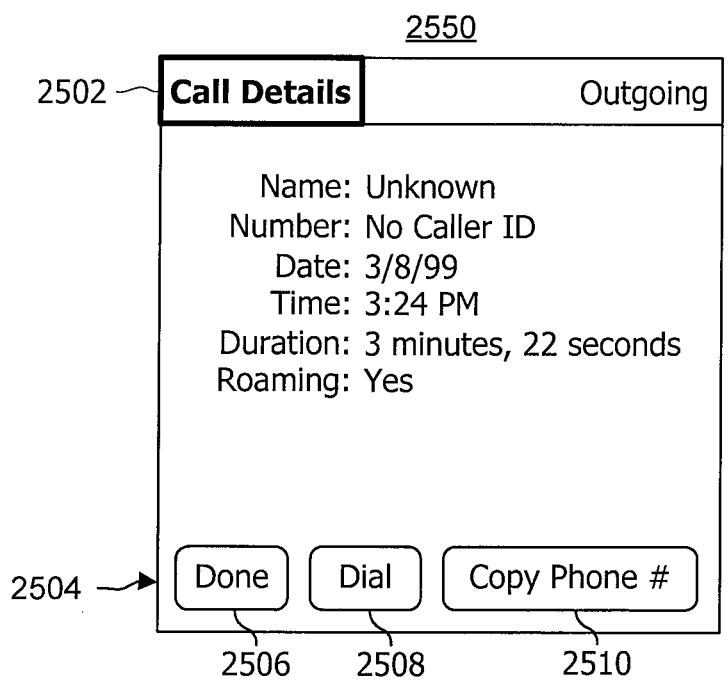

FIGS. 25A-B illustrate embodiments of respective detail views 2500 and 2550. The detail views 2500, 2550 may be displayed by selecting a details menu from the call log view 2400. The detail views 2500, 2550 comprise any information available about a past call. The detail view 2500 comprises a title bar 2502 that includes the text "Call Details" and whether the call detail is regarding an incoming, outgoing, or missed call. As shown in FIG. 25, the detail view 2500 is associated with an outgoing call. The detail views 2500, 2550 content includes fields such as name, number, date, time, duration and roaming status. The name field may comprise the same data provided in the list view 2406 of the call log view 2400. As shown in FIG. 25B, the string "Unknown" is provided in the name field if the there was no caller ID or if the lookup into the address book failed. If there was a number in the call log, that number is displayed in the number field as shown in FIG. 25A. Otherwise, as shown in FIG. 25B, the number field displays "No Caller ID" if there was no caller ID information associated with the call. The other fields generally include information as suggested by the field name. For example, the date and time fields include the date and time of the call. The duration field includes the duration of the call in minutes (if applicable) and seconds. Displaying the duration of the call may be associated with a carrier flag such that the duration field can be displayed or hidden depending on the carrier preference. In the one embodiment, for example, the flag will be set such that the duration is not displayed to the user. The roaming field displays a Yes or a No depending on whether or not the wireless device 100 was roaming at the time of the call.

A series of buttons 2504 are provided to select various functions. For example a done button 2506, a dial button 2508, and a copy phone number 2510 may be provided at the bottom of the call details view 2500, 2550 screen. The dial button 2508 may be tapped to dial the listed phone number in the number field. The dial button does not appear if the phone number was not received via caller ID. The copy phone number # button 2508 cause the phone number to be copied to the copied to the clipboard. The copy phone number # button 2508 does not appear if the phone number was not received via caller ID.

Figure 26A:
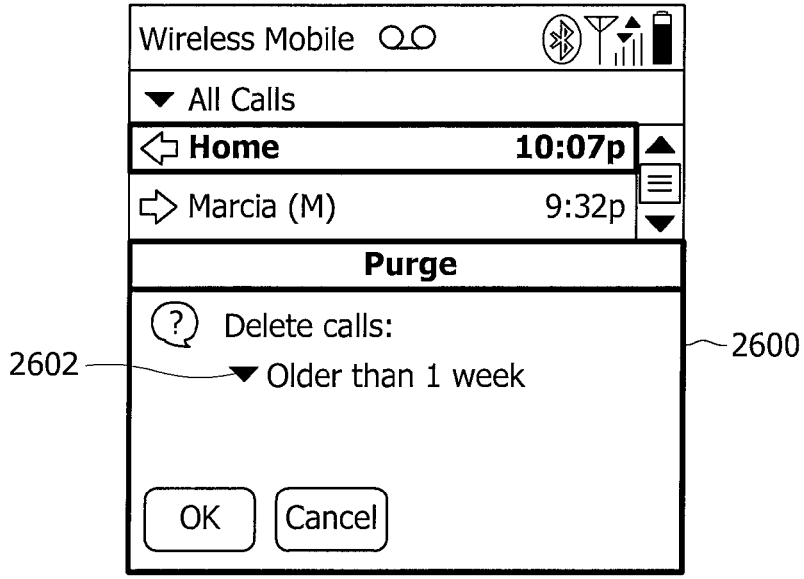
FIGS. 26A-B illustrate one embodiment of a purge dialog box.
Figure 26B:
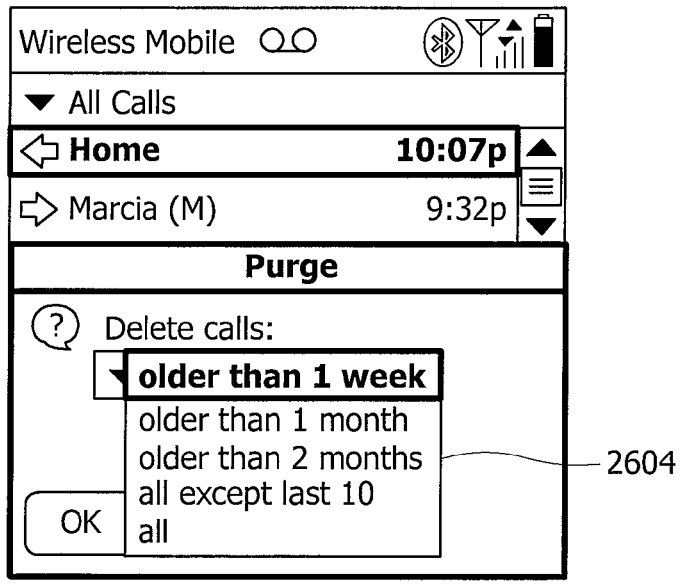

FIGS. 26A-B illustrate one embodiment of a purge dialog box 2600. Selecting the purge menu displays the purge dialog box 2600 to enable the user to delete calls that are older than 1 week, 1 month, 2 months, all except the last 10, or all. The default selection is the last selection chosen by the user. The purge command only removes calls from the category that is selected in the call log view 2400 when the purge command is selected. The purge dialog box 2600 comprises a pop-menu 2602 that enables to user to select delete calls that are older than 1 week, 1 month, 2 months, all except the last 10, or all from the pop-up menu list 2604.

System Level

FIG. 27 illustrates one embodiment of a computing system 2700. In various embodiments, the computing system 2700 may comprise or be implemented by the wireless device 100 of FIG. 1 or any other type of wireless device. The embodiments are not limited in this context. The computing system 2700 may comprise a mobile computing device platform to implement various wireless devices such as, for example, the wireless device 100. Accordingly, the computing system 2700 may be coupled to the antenna 136 of the wireless device 100.

The computing system 2700 generally may comprise various physical or logical elements implemented as hardware, software, or any combination thereof, as desired for a given set of design parameters or performance constraints. In various embodiments, the physical or logical elements may be connected by one or more communications media. Communications media generally may comprise any medium capable of carrying information signals. For example, communication media may comprise wired communication media, wireless communication media, or a combination of both, as desired for a given implementation.

As shown, the computing system 2700 may comprise a display 2702. The display 2702 may be implemented using any type of visual interface such as an LCD. As shown, the display 2702 may comprise a plurality of display regions arranged to implement a panoramic display, as described above. In some embodiments, the display 2702 may have an aspect ratio of 1:1 with a resolution of 320×320, 480×480, and so forth. In other embodiments, the display 2702 may have an aspect ratio of 3:2 with a resolution of 480×320 or other aspect ratio and/or resolution. The embodiments are not limited in this context.

As shown, the telephone user interface functionality may be implemented by a memory 2704. In various embodiments, the memory 2704 may comprise any machine-readable or computer-readable media capable of storing data, including both volatile and non-volatile memory. For example, memory may include read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

The computing system 2700 may comprise a processor 2706 such as a central processing unit (CPU). In various embodiments, the processor 2706 may be implemented as a general purpose processor, a chip multiprocessor (CMP), a dedicated processor, an embedded processor, a digital signal processor (DSP), a network processor, a media processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor 2706 also may be implemented by a controller, a microcontroller, an application specific integrated circuit (ASIC), a field programmable gate array (FPGA), a programmable logic device (PLD), and so forth.

In various embodiments, the processor 2706 may be arranged to run an operating system (OS) and various mobile applications. Examples of an OS include, for example, a Microsoft® Windows OS, a Palm OS®, and any other proprietary or open source OS. Examples of mobile applications include, for example, a telephone application, a camera (e.g., digital camera, video camera) application, a browser application, a multimedia player application, a gaming application, a messaging application (e.g., e-mail, short message, multimedia), a viewer application, and so forth.

In various embodiments, the processor 2706 may be arranged to receive information, such as media source content, through a communications interface 2708. The communications interface 2708 may comprises any suitable hardware, software, or combination of hardware and software that is capable of coupling the computing system 2708 to one or more networks and/or network devices. The communications interface 2708 may be arranged to operate with any suitable technique for controlling information signals using a desired set of communications protocols, services or operating procedures. The communications interface 2708 may include the appropriate physical connectors to connect with a corresponding communications medium.

In various embodiments, the communications interface 2708 may comprise one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the computing system 2700 may include a wireless interface comprising one or more antennas, transmitters, receivers, transceivers, amplifiers, filters, control logic, and so forth.

In various embodiments, the processor 2706 may be configured to execute logic stored in the memory 2704 and present the navigation bar 208 on the display 2702. As previously discussed, the navigation bar 208 comprises multiple selectable tabs 208-1-5. The processor 2706 may be configured to detect an input corresponding to a selection of any one of the multiple selectable tabs 208-1-5 and present a user interface view (e.g., the dial pad views 800, 810, 820, the favorites view 900, the main telephone application view 200, the contacts view 1600, and/or the call log view 2400) associated with any one of the multiple tabs 208-1-5 on the display 2702 when the input is detected. The processor 2706 is to process navigation input to navigate horizontally (e.g., left or right) across the navigation bar 208. The processor 2706 is to execute an application associated with the selected user interface view. In addition, the processor 2706 is to process input from the navigation button 122 and the processor 2706 is to detect an input from the navigation button 122 to navigate horizontally or vertically within the user interface view currently displayed on the display 2702. The processor 2706 is to process the input corresponding to detecting a selection of any one of the multiple tabs 208-1-5 and switch to a newly selected user interface view from within a currently displayed user interface view. As previously discussed, the navigation bar 208 comprises any one of a dial pad view tab 208-1, a favorites tab 208-2, a main telephone application tab 208-3, a contacts tab 208-4, and a call log tab 208-5. The processor 2706 is to execute any one of a dial pad application, a favorites application, a main telephone application, a contacts application, and a call log application in response to a selection of a corresponding dial pad view tab 208-1, favorites tab 208-2, main telephone application tab 208-3, contacts tab 208-4, and call log tab 208-5.

Figure 28:
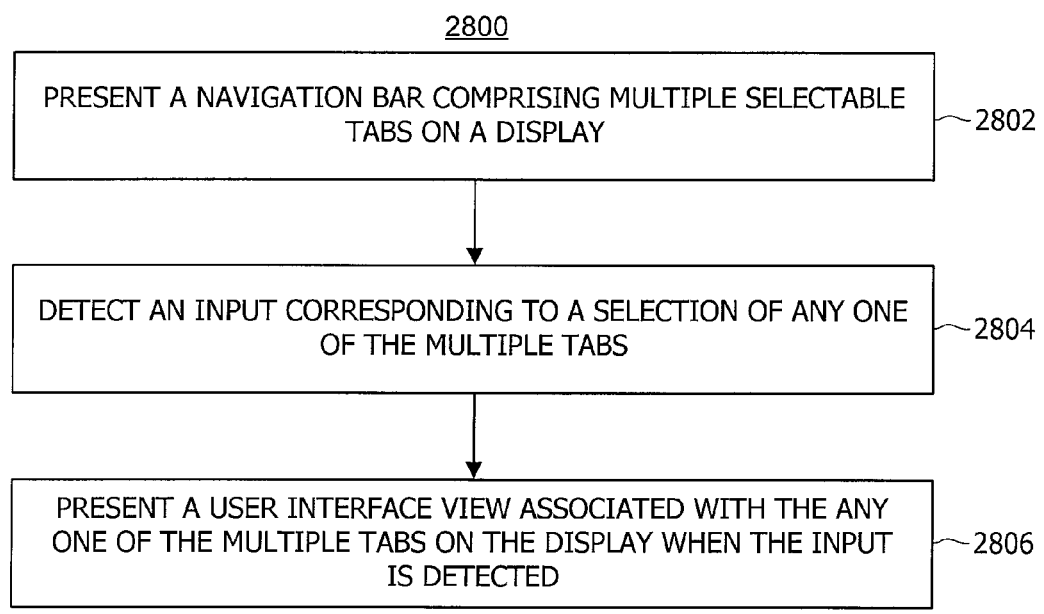
FIG. 28 illustrates one embodiment of a logic flow.

FIG. 28 illustrates one embodiment of a logic flow 2800 that may be executed by one or more processors in the wireless device 100 and/or the computing system 2700 to provide a user interface for the wireless device 100 and/or the computing system 2700 in accordance with the embodiments discussed herein. Accordingly, the processor 2706 presents (2802) a navigation bar 208 comprising multiple selectable tabs 208-1-5 on the display 2702. The processor 2706 detects (2804) an input corresponding to a selection of any of the multiple tabs 208-1-5. The processor presents (2806) a user interface view associated with the any one of the multiple tabs 208-1-5 on the display 2702 when the input is detected. For example, the processor 2706 is to present a user interface view such as, e.g., the dial pad views 800, 810, 820, the favorites view 900, the main telephone application view 200, the contacts view 1600, and/or the call log view 2400 associated with any one of the corresponding dial pad view tab 208-1, favorites tab 208-2, main telephone application tab 208-3, contacts tab 208-4, and call log tab 208-5 when the input is detected.

In various other embodiments, the processor 2706 processes the navigation input to navigate horizontally (e.g., left or right) across the navigation bar 208. The processor 2706 executes an application associated with the selected user interface view. In addition, the processor 2706 processes input from the navigation button 122, detects an input from the navigation button 122, and navigates horizontally or vertically within the user interface view currently displayed on the display 2702. The processor 2706 processes the input corresponding to a selection of any one of the multiple tabs 208-1-5 and switches to a newly selected user interface view from within a currently displayed user interface view. As previously discussed, the navigation bar 208 comprises any one of a dial pad view tab 208-1, a favorites tab 208-2, a main telephone application tab 208-3, a contacts tab 208-4, and a call log tab 208-5. The processor 2706 executes any one of a dial pad application, a favorites application, a main telephone application, a contacts application, and a call log application in response to detecting a selection of a corresponding dial pad view tab 208-1, favorites tab 208-2, main telephone application tab 208-3, contacts tab 208-4, and call log tab 208-5.

In various implementations, the described embodiments may communicate over wireless shared media in accordance with a number of wireless protocols. Examples of wireless protocols may include various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may include various wireless wide area network (WWAN) protocols, such as GSM cellular radiotelephone system protocols with GPRS, CDMA cellular radiotelephone communication systems with 1xRTT, EDGE systems, EV-DO systems, EV-DV systems, HSDPA systems, and so forth. Further examples of wireless protocols may include wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may include near-field communication techniques and protocols, such as electro-magnetic induction (EMI) techniques. An example of EMI techniques may include passive or active radio-frequency identification (RFID) protocols and devices. Other suitable protocols may include Ultra Wide Band (UWB), Digital Office (DO), Digital Home, Trusted Platform Module (TPM), ZigBee, and so forth.

In various implementations, the described embodiments may comprise part of a cellular communication system. Examples of cellular communication systems may include CDMA cellular radiotelephone communication systems, GSM cellular radiotelephone systems, North American Digital Cellular (NADC) cellular radiotelephone systems, Time Division Multiple Access (TDMA) cellular radiotelephone systems, Extended-TDMA (E-TDMA) cellular radiotelephone systems, Narrowband Advanced Mobile Phone Service (NAMPS) cellular radiotelephone systems, third generation (3G) systems such as WCDMA, CDMA-2000, UMTS cellular radiotelephone systems compliant with the Third-Generation Partnership Project (3GPP), and so forth.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. A wireless device, comprising:
a processor;
a memory coupled to said processor; and
a display coupled to said processor, said processor to:
present a title bar on a top portion of said display, said title bar comprising multiple icons, with said multiple icons comprising a data status icon representing status for data communication, a signal strength icon and a battery meter icon;
present a messaging bar having an icon representing a pending message;
present a calendar event bar having text representing a calendar event, said calendar event bar is selectable to launch a calendar application to view a time period including said calendar event;
present a navigation bar on a bottom portion of said display, said navigation bar comprising multiple selectable icons;
detect an input corresponding to a selection of any one of said multiple icons; and
present a user interface view associated with said any one of said multiple icons on said display when said input is detected.

2. The wireless device of claim 1, wherein said processor is to process navigation input to navigate horizontally across said navigation bar.

3. The wireless device of claim 1, wherein said processor is to execute an application associated with said user interface view.

4. The wireless device of claim 1, further comprising a navigation button and wherein said processor is to detect an input from said navigation button to navigate horizontally or vertically within said user interface view.

5. The wireless device of claim 4, wherein said processor is to process said input corresponding to detecting a selection of any one of said multiple icons and switch to a newly selected user interface view from within a currently displayed user interface view.

6. The wireless device of claim 1, wherein said navigation bar comprises any one of a dial pad view icon, a favorites icon, a contacts icon, and a call log icon.

7. The wireless device of claim 6, wherein said processor is to execute any one of a dial pad application, a favorites application, a main telephone application, a contacts application, and a call log application in response to a selection of a corresponding said dial pad view icon, said favorites icon, said main telephone application icon, said contacts icon, and said call log icon.

8. A method, comprising:
presenting a title bar on a top portion of a display, said title bar comprising multiple icons, with said multiple icons comprising a data status icon representing status for data communication, a signal strength icon and a battery meter icon;
presenting a messaging bar having an icon representing a pending message;
presenting a calendar event bar having text representing a calendar event, said calendar event bar is selectable to launch a calendar application to view a time period including said calendar event;
presenting a navigation bar on a bottom portion of said display, said navigation bar comprising multiple selectable icons;
detecting an input corresponding to a selection of any one of said multiple icons; and
presenting a user interface view associated with said any one of said multiple icons on said display when said input is detected.

9. The method of claim 8, comprising:
processing navigation input to navigate horizontally across said navigation bar.

10. The method of claims 8, comprising:
executing an application associated with said user interface view.

11. The method of claim 8, comprising:
detecting an input from a navigation button to navigate horizontally or vertically within said user interface view.

12. The method of claim 11, comprising:
processing said input corresponding to detecting a selection of any one of said multiple icons; and
switching to a newly selected user interface view from within a currently displayed user interface view.

13. The method of claim 8, comprising:
executing any one of a dial pad application, a favorites application, a main telephone application, a contacts application, and a call log application in response to selecting a corresponding dial pad view icon, a favorites icon, said main telephone application icon, a contacts icon, and a call log icon.

14. A system for a wireless device, comprising:
an antenna;
a mobile computing device platform coupled to said antenna;
a processor coupled to said mobile device platform;
a memory coupled to said processor; and
a display coupled to said processor, said processor to:
present a title bar on a top portion of said display, said title bar comprising multiple icons, with said multiple icons comprising a data status icon representing status for data communication, a signal strength icon and a battery meter icon;
present a messaging bar having an icon representing a pending message;
present a calendar event bar having text representing a calendar event, said calendar event bar is selectable to launch a calendar application to view a time period including said calendar event;
present navigation bar on a bottom portion of said display, said navigation bar comprising multiple selectable icons;
detect an input corresponding to a selection of any one of said multiple icons; and
present a user interface view associated with said any one of said multiple icons on said display when said input is detected.

15. The system of claim 14, wherein said processor is to process navigation input to navigate horizontally across said navigation bar.

16. The system of claim 14, wherein said processor is to execute an application associated with said user interface view.

17. The system of claim 14, further comprising a navigation button and wherein said processor is to detect an input from said navigation button to navigate horizontally or vertically within said user interface view.

18. The system of claim 17, wherein said processor is to process said input corresponding to detecting a selection of any one of said multiple icons and switch to a newly selected user interface view from within a currently displayed user interface view.

19. The system of claim 14, wherein said navigation bar comprises any one of a dial pad view icon, a favorites icon, a contacts icon, and a call log icon.

20. The system of claim 19, wherein said processor is to execute any one of a dial pad application, a favorites application, a main telephone application, a contacts application, and a call log application in response to a selection of a corresponding said dial pad view icon, said favorites icon, said main telephone application icon, said contacts icon, and said call log icon.

21. An article comprising a non-transitory computer-readable storage medium containing instructions that, when executed by a processor, enable a system to:
   present a title bar on a top portion of a display, said title bar comprising multiple icons, with said multiple icons comprising a data status icon representing status for data communication, a signal strength icon and a battery meter icon;
   present a messaging bar having an icon representing a pending message;
   present a calendar event bar having text representing a current event or next scheduled event, said calendar event bar is selectable to launch a calendar application to view a time period including said current event or next scheduled event;
   present a navigation bar on a bottom portion of said display, said navigation bar comprising multiple selectable icons;
   detect an input corresponding to a selection of any one of said multiple icons; and
   present a user interface view associated with said any one of said multiple icons on said display when said input is detected.

22. The article of claim 21, further comprising instructions that if executed by a processor enable the system to process navigation input to navigate horizontally across said navigation bar.

23. The article of claim 21, further comprising instructions that if executed by a processor enable the system to execute an application associated with said user interface view.

24. The article of claim 21, further comprising instructions that if executed by a processor enable the system to detect an input from a navigation button to navigate horizontally or vertically within said user interface view.

25. The article of claim 24, further comprising instructions that if executed by a processor enable the system to processing said input corresponding to detect a selection of any one of said multiple icons; and switch to a newly selected user interface view from within a currently displayed user interface view.

26. The article of claim 21, further comprising instructions that if executed by a processor enable the system to execute any one of a dial pad application, a favorites application, a main telephone application, a contacts application, and a call log application in response to selecting a corresponding dial pad view icon, a favorites icon, said main telephone application icon, a contacts icon, and a call log icon.

* * * * *